United States Patent
Chan

(10) Patent No.: US 7,627,750 B1
(45) Date of Patent: *Dec. 1, 2009

(54) INFORMATION DISTRIBUTION AND PROCESSING SYSTEM

(75) Inventor: Hark C. Chan, Cupertino, CA (US)

(73) Assignee: Data Innovation, LLC, Newport Beach, CA (US)

( * ) Notice: Subject to any disclaimer, the term of this patent is extended or adjusted under 35 U.S.C. 154(b) by 764 days.

This patent is subject to a terminal disclaimer.

(21) Appl. No.: 10/932,540

(22) Filed: Sep. 2, 2004

Related U.S. Application Data

(63) Continuation of application No. 10/244,850, filed on Sep. 17, 2002, now Pat. No. 6,789,198, which is a continuation of application No. 09/177,681, filed on Oct. 22, 1998, now Pat. No. 6,473,860, which is a continuation-in-part of application No. 08/939,368, filed on Sep. 29, 1997, now Pat. No. 6,021,307, which is a continuation-in-part of application No. 08/644,838, filed on May 10, 1996, now abandoned, which is a continuation-in-part of application No. 08/279,424, filed on Jul. 25, 1994, now abandoned, and a continuation-in-part of application No. 08/255,649, filed on Jun. 8, 1994, now abandoned, which is a continuation-in-part of application No. 08/224,280, filed on Apr. 7, 1994, now abandoned.

(51) Int. Cl.
*H04L 29/06* (2006.01)
*H04L 29/00* (2006.01)

(52) U.S. Cl. ............... 713/156; 713/153; 713/155; 713/157; 713/172; 713/183; 705/51; 705/54; 705/57; 707/200; 726/1; 726/5; 726/26; 380/201

(58) Field of Classification Search .......... 713/156
See application file for complete search history.

(56) References Cited

U.S. PATENT DOCUMENTS

| 3,824,597 A | 7/1974 | Berg |
| 3,967,202 A | 6/1976 | Batz |
| 4,054,911 A | 10/1977 | Fletcher et al. |
| 4,081,832 A | 3/1978 | Sherman |
| 4,191,860 A | 3/1980 | Weber |
| 4,215,406 A | 7/1980 | Gomola et al. |

(Continued)

FOREIGN PATENT DOCUMENTS

WO    WO 89/08299    9/1989

(Continued)

OTHER PUBLICATIONS

John P. Hayes, "Computer Architecture and Organization", pp. 398-421, Jan. 1988.

(Continued)

*Primary Examiner*—Syed A. Zia
*Assistant Examiner*—Bryan Wright
(74) *Attorney, Agent, or Firm*—Martin & Ferraro, LLP

(57) ABSTRACT

A method for delivering digital data to a plurality of processing units is disclosed. A plurality of portable memory device containing a first set of digital data is distributed to the plurality of processing units. The first set of digital data is unencrypted and comprises a content portion and an identification label. At least one of the processing units sends the identification label to a remote station. The remote station then encrypts a second set of digital data and delivers the encrypted data to the requesting processing unit. The requesting processing unit can decrypt the encrypted data, and combine the decrypted second set of data with the content portion.

43 Claims, 4 Drawing Sheets

U.S. PATENT DOCUMENTS

| | | | |
|---|---|---|---|
| 4,215,407 A | 7/1980 | Gomola et al. | |
| 4,307,416 A | 12/1981 | Spano | |
| 4,430,639 A | 2/1984 | Bennett | |
| 4,442,502 A | 4/1984 | Friend et al. | |
| 4,528,643 A | 7/1985 | Freeny, Jr. | |
| 4,556,904 A | 12/1985 | Monat | |
| 4,563,702 A | 1/1986 | Heller | |
| 4,598,318 A | 7/1986 | Robbins | |
| 4,635,113 A | 1/1987 | Okada et al. | |
| 4,649,384 A | 3/1987 | Sheafor et al. | |
| 4,694,490 A | 9/1987 | Harvey et al. | 380/284 |
| 4,734,858 A | 3/1988 | Schlafly | 364/408 |
| 4,736,365 A | 4/1988 | Stern | |
| 4,742,544 A | 5/1988 | Kupnicki et al. | 380/14 |
| 4,768,087 A | 8/1988 | Taub et al. | |
| 4,823,388 A | 4/1989 | Mizutani et al. | |
| 4,827,508 A | 5/1989 | Shear | |
| 4,835,683 A | 5/1989 | Phillips | |
| 4,860,352 A | 8/1989 | Laurance et al. | 380/23 |
| 4,873,662 A | 10/1989 | Sargent | |
| 4,877,404 A | 10/1989 | Warren et al. | 434/118 |
| 4,899,292 A | 2/1990 | Montagna et al. | |
| 4,965,825 A | 10/1990 | Harvey et al. | |
| 4,987,595 A | 1/1991 | Marino, Jr. et al. | 380/50 |
| 5,003,384 A | 3/1991 | Durden et al. | |
| 5,010,571 A | 4/1991 | Katznelson | |
| 5,029,206 A | 7/1991 | Marino, Jr. et al. | 380/4 |
| 5,058,000 A | 10/1991 | Cox | |
| 5,081,678 A | 1/1992 | Kaufman et al. | |
| 5,083,271 A | 1/1992 | Thacher et al. | |
| 5,099,516 A | 3/1992 | Durkin et al. | |
| 5,103,476 A | 4/1992 | Waite et al. | |
| 5,124,909 A | 6/1992 | Blakely | |
| 5,128,981 A | 7/1992 | Tsukamoto et al. | 379/58 |
| 5,132,680 A | 7/1992 | Tezuka et al. | 340/825.08 |
| 5,155,847 A | 10/1992 | Kirouac et al. | |
| 5,157,783 A | 10/1992 | Anderson et al. | 395/600 |
| 5,185,794 A | 2/1993 | Thompson et al. | 380/17 |
| 5,208,671 A | 5/1993 | Tarrant | 358/147 |
| 5,208,857 A | 5/1993 | Lebrat | 380/14 |
| 5,214,697 A | 5/1993 | Saito | 380/4 |
| 5,222,134 A | 6/1993 | Waite et al. | |
| 5,237,411 A | 8/1993 | Fink et al. | 358/146 |
| 5,239,540 A | 8/1993 | Rovira et al. | 370/77 |
| 5,241,671 A | 8/1993 | Reed et al. | |
| 5,247,347 A | 9/1993 | Litteral et al. | |
| 5,247,575 A | 9/1993 | Sprague et al. | |
| 5,265,065 A | 11/1993 | Turtle | |
| 5,267,314 A | 11/1993 | Stambler | |
| 5,282,247 A | 1/1994 | McLean et al. | |
| 5,283,828 A | 2/1994 | Saunders et al. | 380/4 |
| 5,319,542 A | 6/1994 | King, Jr. et al. | |
| 5,319,707 A | 6/1994 | Wasilewski et al. | 380/14 |
| 5,321,748 A | 6/1994 | Zeidler et al. | 380/14 |
| 5,321,750 A | 6/1994 | Nadan | 380/20 |
| 5,323,148 A | 6/1994 | Olazabal et al. | 340/825.44 |
| 5,327,174 A | 7/1994 | Kim | 348/468 |
| 5,335,275 A | 8/1994 | Millar et al. | 380/4 |
| 5,335,277 A | 8/1994 | Harvey et al. | |
| 5,335,278 A | 8/1994 | Matchett et al. | 380/23 |
| 5,341,429 A | 8/1994 | Stringer et al. | |
| 5,343,494 A | 8/1994 | Averst et al. | 375/1 |
| 5,347,632 A | 9/1994 | Filepp et al. | |
| 5,361,399 A | 11/1994 | Linquist et al. | 455/561 |
| 5,365,591 A | 11/1994 | Carswell et al. | 380/49 |
| 5,377,266 A | 12/1994 | Katta et al. | 380/20 |
| 5,381,476 A | 1/1995 | Kimoto et al. | 380/201 |
| 5,383,185 A | 1/1995 | Armbruster et al. | 370/85.3 |
| 5,384,835 A | 1/1995 | Wheeler et al. | 379/93.25 |
| 5,388,101 A | 2/1995 | Dinkins | 370/95.1 |
| 5,392,023 A | 2/1995 | D'Avello et al. | 379/100 |
| 5,392,353 A | 2/1995 | Morales | 380/20 |
| 5,394,559 A | 2/1995 | Hemmie et al. | |
| 5,400,403 A | 3/1995 | Fahn et al. | |
| 5,404,505 A | 4/1995 | Levinson | 395/600 |
| 5,414,644 A | 5/1995 | Seaman et al. | |
| 5,418,948 A | 5/1995 | Turtle | |
| 5,432,798 A | 7/1995 | Blair | 371/32 |
| 5,442,771 A | 8/1995 | Filepp et al. | |
| 5,444,769 A | 8/1995 | Koen et al. | 379/94 |
| 5,446,891 A | 8/1995 | Kaplan et al. | |
| 5,452,356 A | 9/1995 | Albert | 380/9 |
| 5,457,746 A * | 10/1995 | Dolphin | 705/51 |
| 5,481,542 A | 1/1996 | Logston et al. | |
| 5,488,725 A | 1/1996 | Turtle et al. | |
| 5,489,952 A | 2/1996 | Gove et al. | |
| 5,506,984 A | 4/1996 | Miller | |
| 5,509,070 A | 4/1996 | Schull | |
| 5,510,992 A | 4/1996 | Kara | |
| 5,519,866 A | 5/1996 | Lawrence et al. | |
| 5,524,073 A | 6/1996 | Stambler | |
| 5,528,490 A | 6/1996 | Hill | |
| 5,530,740 A | 6/1996 | Irribarren | |
| 5,530,751 A | 6/1996 | Morris | |
| 5,534,857 A | 7/1996 | Laing et al. | |
| 5,539,449 A | 7/1996 | Blahut et al. | 348/7 |
| 5,543,789 A | 8/1996 | Behr et al. | |
| 5,555,303 A | 9/1996 | Stambler | |
| 5,555,407 A | 9/1996 | Cloutier et al. | |
| 5,559,936 A | 9/1996 | Poulter et al. | |
| 5,563,946 A | 10/1996 | Cooper et al. | |
| 5,592,551 A | 1/1997 | Lett | |
| 5,613,004 A | 3/1997 | Cooperman et al. | 380/28 |
| 5,625,690 A | 4/1997 | Michel et al. | |
| 5,629,867 A | 5/1997 | Goldman | 364/514 |
| 5,640,192 A | 6/1997 | Garfinkle | |
| 5,646,998 A | 7/1997 | Stambler | |
| 5,668,592 A | 9/1997 | Spaulding | |
| 5,668,950 A | 9/1997 | Kikuchi et al. | |
| 5,677,953 A | 10/1997 | Dolphin | |
| 5,682,318 A | 10/1997 | Kara | |
| 5,692,073 A | 11/1997 | Cass | |
| 5,694,546 A | 12/1997 | Reisman | |
| 5,697,844 A | 12/1997 | Von Kohorn | 370/310 |
| 5,721,827 A | 2/1998 | Logan | |
| 5,734,853 A | 3/1998 | Hendricks et al. | |
| 5,737,595 A | 4/1998 | Cohen et al. | |
| 5,742,677 A * | 4/1998 | Pinder et al. | 380/242 |
| 5,754,646 A | 5/1998 | Williams et al. | |
| 5,754,864 A | 5/1998 | Hill | |
| 5,757,913 A | 5/1998 | Bellare et al. | 713/168 |
| 5,761,649 A | 6/1998 | Hill | 705/27 |
| 5,774,886 A | 6/1998 | Kara | |
| 5,778,076 A | 7/1998 | Kara et al. | 380/51 |
| 5,784,609 A | 7/1998 | Kurihara | |
| 5,793,302 A | 8/1998 | Stambler | |
| 5,796,967 A | 8/1998 | Filepp et al. | |
| 5,812,929 A | 9/1998 | Tsutsui et al. | |
| 5,818,911 A | 10/1998 | Kawashima | |
| 5,819,034 A | 10/1998 | Joseph et al. | |
| 5,870,474 A | 2/1999 | Wasilewski et al. | 380/21 |
| 5,875,108 A | 2/1999 | Hoffberg et al. | |
| 5,887,065 A | 3/1999 | Audebert | 380/23 |
| 5,887,243 A | 3/1999 | Harvey et al. | 455/3.1 |
| 5,899,998 A | 5/1999 | McGauley | 707/104 |
| 5,933,604 A | 8/1999 | Inakoshi | |
| 5,936,541 A | 8/1999 | Stambler | |
| 5,954,793 A | 9/1999 | Stutman et al. | |
| 5,961,593 A | 10/1999 | Gabber et al. | |
| 5,968,129 A | 10/1999 | Dillon | |
| 5,970,471 A | 10/1999 | Hill | |
| 5,974,148 A | 10/1999 | Stambler | |
| 5,990,927 A | 11/1999 | Hendricks | |
| 5,995,628 A | 11/1999 | Kitaj et al. | 380/49 |

| | | | |
|---|---|---|---|
| 5,995,725 A | 11/1999 | Dillon | |
| 5,999,525 A | 12/1999 | Krishnaswamy et al. | |
| 5,999,934 A | 12/1999 | Cohen et al. | |
| 6,005,938 A * | 12/1999 | Banker et al. | 380/239 |
| 6,021,307 A | 2/2000 | Chan | |
| 6,029,142 A | 2/2000 | Hill | |
| 6,029,150 A * | 2/2000 | Kravitz | 705/39 |
| 6,044,365 A | 3/2000 | Cannon et al. | |
| 6,055,314 A | 4/2000 | Spies et al. | |
| 6,076,094 A | 6/2000 | Cohen et al. | |
| 6,078,612 A | 6/2000 | Bertrand et al. | 375/219 |
| 6,089,453 A | 7/2000 | Kayser | |
| 6,097,816 A | 8/2000 | Momiki et al. | |
| 6,125,388 A | 9/2000 | Reisman | |
| 6,131,088 A | 10/2000 | Hill | |
| 6,185,265 B1 | 2/2001 | Campanella | |
| 6,188,869 B1 | 2/2001 | Chan | |
| 6,233,568 B1 | 5/2001 | Kara | |
| 6,253,059 B1 | 6/2001 | Chan | |
| 6,266,654 B1 | 7/2001 | Schull | |
| 6,289,200 B1 | 9/2001 | Chan | |
| 6,314,574 B1 | 11/2001 | Chan | |
| 6,317,785 B1 | 11/2001 | Chan | |
| 6,339,693 B1 | 1/2002 | Chan | |
| 6,343,380 B1 | 1/2002 | Chan | |
| 6,347,215 B1 | 2/2002 | Chan | |
| 6,349,409 B1 | 2/2002 | Chan | |
| 6,397,387 B1 | 5/2002 | Rosin et al. | |
| 6,473,860 B1 | 10/2002 | Chan | |
| 6,600,908 B1 | 7/2003 | Chan | |
| 6,609,202 B1 | 8/2003 | Chan | |
| 6,665,797 B1 | 12/2003 | Keung | |
| 6,766,140 B1 | 7/2004 | Chan | |
| 6,772,344 B1 | 8/2004 | Chan | |
| 6,789,198 B1 | 9/2004 | Chan | |
| 7,072,849 B1 | 7/2006 | Filepp et al. | |
| 7,181,758 B1 | 2/2007 | Chan | |
| 2002/0069282 A1 | 6/2002 | Reisman | |
| 2002/0112171 A1* | 8/2002 | Ginter et al. | 713/185 |
| 2002/0124055 A1 | 9/2002 | Reisman | |
| 2002/0129094 A1 | 9/2002 | Reisman | |
| 2002/0186887 A1 | 12/2002 | Rhoads | |
| 2007/0258401 A1 | 11/2007 | Chan | |
| 2007/0258430 A1 | 11/2007 | Chan | |
| 2007/0271581 A1 | 11/2007 | Chan | |

FOREIGN PATENT DOCUMENTS

WO          93/09631          5/1993

OTHER PUBLICATIONS

Russell N. Nelson, Deposition transcript and CDROM, Aug. 2003.
Douglas Branstetter, Deposition transcript and CDROM, Aug. 2003.
E. Rescorla, A. Schiffman, "The Secure HyperText Transfer Protocol," Jun. 1994.
David Raggett, HTML+ (Hypertext Markup Language), pp. 1-31, Jul. 12, 1993, WWW Discussion Group Request for Comments.
S. Deering, "Host Extensions for IP Multicasting", pp. 1-17, Aug. 1989, Network Working Group, Request for Comments: 1112.
Cricket Liu, et al., "Managing Internet Information Services", pp. 279-298, Dec. 1994, O'Reilly & Associates, Inc.
Yoshiko Hara, "Consortium Eyes Satellite-Based E-Book System", Electronic Engineering Times, Oct. 1998.
"Automatic Hypermedia Link Generation"; IBM Technical Disclosure Bulletin; vol. 35; No. 1A; pp. 447-448; Jun. 1992 (Joint 003687 to 003689).
"CD-Rom With Baseball Daily Online To Hit Stores as Microsoft Home's First Complete Sports Software; Comprehensive, Multimedia Guide to America's Favorite Pastime Is an Official Publication of Major League Baseball"; Business Wire; Jun. 10, 1994 (Joint 003665 to 003668).

"CompuServe Incorporated and Metatec Corporation Announce Strategic Alliance"; PR Newswire; Sep. 20, 1993 (Joint 003789 to 003790).
"CompuServe Releases CD"; Newsbytes; Jun. 3, 1994 (Joint 009893 to 009894).
"Connect with Nautilus CD"; Jun. 1994.
"Creating the Hypertext Cluster"; Mar. 21, 2002 (fourteen pages).
"Database Management"; MacUser; vol. 8; No. 13; p. 103; Jan. 1993 (Joint 003767 to 003772).
"Dialog OnDisc Links: CD-ROM and Online Providing a Complementary Service"; Library Micromation News; No. 24; pp. 11-16; Jun. 1989.
"First International Conference on the World-Wide Web"; May 25-27, 1994 (ten pages).
"FT adds features, loses manager"; Information World Review; No. 84; Sep. 1993 (Joint 003701 to 003703).
"Fully Digital GML based Authoring and Delivering System for Hypermedia"; IBM Technical Disclosure Bulletin; vol. 35; No. 2; pp. 458-463; Jul. 1992.
"Getting Multimedia From a Kit"; Smart Computing; vol. 4; issue 5; May 1993 (eight pages).
"History of Ovid Technologies"; Feb. 5, 2002 (three pages).
"How money programs compare"; SJM News, p. E4; Oct. 1994 (Joint 010810).
"Library for Psychiatrists; American Psychiatric Press Inc.'s CD-ROM Library"; Information Today; vol. 10; No. 6; p. 30; Jun. 1993 (two pages).
"Local Area Network Program Distribution Facility"; IBM Technical Disclosure Bulletin; vol. 33; No. 5; pp. 169-171; Oct. 1990 (Joint 003695 to 003698).
"Microsoft CD-ROM Yearbook: 1989-1990"; Microsoft; pp. 163-170; 1990 (Joint 5390 to 5400).
"Microsoft Continues Home Momentum With Nine New Products; Showcases New Products and Previews First Online enhancement to CD-ROM Product"; Business Wire; Mar. 1, 1994 (Joint 003660 to 003664).
"New CompuServe CD-ROM Brings the Power of Multimedia to Online Computing"; PR Newswire; Jun. 1, 1994 (Joint 009880 to 9884, 9891, and 9892).
"Online banking popular"; Journal American; Jun. 30, 1994 (Joint 010820).
"Reviews/Products Comparison"; InfoWorld; p. 86; Dec. 7, 1992 (Joint003704 to 003727).
"S&P And Dialog Introduce Company Information On CD-ROM; Standard & Poor's Corp., CD-ROM Disc"; Information Today; vol. 5; No. 6; p. 22; Jun. 1988 (Joint 003699 to 003700).
"Web/CD-ROM Hybrids, A Working Definition"; Feb. 1, 2002 (five pages).
Alber, Antone; Videotex/Teletext, Principles and Practices; McGraw-Hill Book Company; ISBN 0-07-000957-0; 1985.
Andreessen, Marc; "New X-based Information Systems Browser Available"; Feb. 16, 1993 (two pages).
Andres, Clay; "Authoring Tools Help Developers Deliver Multimedia Message on CD"; Dec. 6, 1993 (four pages).
Apple Computer, Inc.; AppleLink 6.1 and related documentation; Jun. 1991 (Joint 001169 to 001767).
Apple Computer, Inc.; File Folder—PR 125 A112; Letter and Encrypted Software Distribution and Vending Agreement; (Joint 009184 to 009215).
Apple InfoMACIII compilation CD-ROM produced by Defendant Casio, Inc., in the action styled *Hark Chan v. Brother International Corp. et al.*, Case No. CO3-2694 VRM (N.D. Cal.) (The CD is essentially a compilation of various freeware and shareware programs, which Casio alleges "comprises a collection of software and data containing links allowing access to online features".
Bain, G. Donald; "Pinpointing Differences between Atlas Pro, Map Info."; MacWeek, vol. 6; Mar. 9, p. 32; 1992 (Joint 003651 to 003652).
Baker, Gary; "The Mac Internet Tour Guide"; Jan. 1994 (three pages).
Barr, Christopher; "Buy? Hold? Sell? MarketArts Windows on Wall Street"; *PC Magazine*; vol. 13; No. 11; p. 30; Jun. 14, 1994 (Joint 003654 to 003655).

Barr, Christopher; "On-line to Tomorrowland"; *PC Magazine*; p. 30; Jan. 25, 1994 (Joint 003653).

Beiser, Karl; "What a difference a year makes: CD-ROM developments"; Online; vol. 17; No. 3; p. 109; May 1993 (six pages).

Bermant, Charles; "Enhanced CD's Promise to Redefine 'Liner Notes"; New York Times; Dec. 11, 1994 (three pages).

Bond, Helen; "Banks hope their customers plug in to on-line bill paying"; The Dallas Morning News; Sep. 18, 1994 (Joint 010811).

Bower, Gail L.; "CD-Rom, EDI, and POS: Powercom-2000"; CD-ROM Professional; pp. 117-121; Jul./Aug. 1994.

Branstetter, Douglas; Deposition transcript; Aug. 2003.

Brown, C.; "Net 286 Gazette Online Magazine"; No. 1.05; Sep. 25, 1993 (thirty-three pages).

Bryant, Gayle; "Combining Online and Disc"; Online & CD-ROM Review; vol. 17; No. 6; pp. 386-398; Dec. 1993 (Joint 003656 to 003659).

Burrill, William; "You Can Be the Manager with These Baseball Games"; Toronto Star, sec. LIFE; p. F4; (Earl Weaver Baseball) Aug. 31, 1991 (Joint 7898 to 7900).

CCH Access and related documentation and video; CCH, Inc.; 1993 (Joint 7758 to 7854; 7958).

CompuServe CD-ROM documents; 1994 (Joint 009899 to 009910, 009912, 009913, 009915 to 009923).

CompuServe documents; Aug. 13, 2002 (Joint 009887 to 009888).

CompuServe Magazine; Jul. 1994 (Joint 010743 to 010747).

CompuServe Magazine; May 1994 (Joint 010748 to 010749).

CompuServe screenshots; Sep. 19, 2003 (Joint 011139 to 011145).

CompuServe; CompuServe CD (CCD) and related documentation; May 1994 (Joint 7880).

Deering, S.; "Host Extensions for IP Multicasting"; pp. 1-17; Aug. 1989; Network Working Group; Request for Comments: 1112 (sixteen pages).

Dialog Corp.; Dialog on Disc and related documentation; Jan. 1993; (Joint 7739 to 7751).

Enbysk, Monte; "Banking at home; New software gives access via computer"; Journal American; Feb. 11, 1994; (Joint 010822 to 010823).

File History of U.S. Patent No. 5,157,783 to Anderson et al.; issued Oct. 20, 1992 (West) (Joint 00143 to 00605).

File History of U.S. Patent No. 5,694,546 to Reisman, issued Dec. 2, 1997 (Reisman) (Joint 00606 to 00882).

Fillmore, Laura; "Internet Publishing: How We Must Think"; Dec. 7, 1993 (seven pages).

Flynn, Laurie; "CD-ROMs: They're Not Just for Entertainment"; New York Times; p. 10; Apr. 24, 1994.

Gautier et al.; "Automatic Program Recording System"; Radiodiff et TV; (w/translation) Nov. 1975 (twenty pages).

Gecsei, Jan; The Architecture of Videotex Systems; Prentice-Hall Inc.; ISBN 0130447765; 1983.

Germain, Joseph; "Citations from Engineering Index: EIX"; Jan. 28, 2002 (ten pages).

Gorillas in the Disc CD-ROM and Documentation; 1991 (Joint 009183.1 to 009183.10).

Griffith, Cary; "The Federal Register on CD-ROM"; Information Today; vol. 9; No. 11; pp. 32-34; Dec. 1992 (Joint 003682 to 003686).

Hara, Yoshiko; "Consortium Eyes Satellite-Based E-Book System"; Electronic Engineering Times; Oct. 1998 (two pages).

Hayes, John P.; "Computer Architecture and Organization"; pp. 398-421; Jan. 1988.

Jacso, Peter; "Compuserve does CD-ROM; Product Announcement"; Information Today; Oct. 1994 (Joint 009895 to 009897).

Johnson, Chris; "Gatekeeper and Mosaic" (three pages).

Keizer, Gregg; "Digital Dollars & Silicon Cents"; PC Magazine; pp. 235-244; Jan. 25, 1994 (Joint 003731 to 003736).

Keizer, Gregg; "MECA's Managing Your Money Breaks Into the Windows Market"; PC Magazine; vol. 13; No. 12; p. 37; Jun. 28, 1994 (Joint 003728 to 003730).

Keizer, Gregg; "Money Matters; PC Personal-Finance Packages"; Computer Shopper; Aug. 1994; (Joint 010813 to 010819).

Kobielus, James; "Look Before Leaping Into Internet Electronic Commerce"; Network World; p. 32; Feb. 28, 1994 (three pages).

Kristof, Kathy; "Breathing new life into home banking; Computer, TV and phone hookups are new ways of visiting the teller's window"; Chicago Tribune; Jan. 4, 1994 (Joint 010824).

Liestol, Gunnar; "Hypermedia Communication and Academic Discourse: Some Speculations on a Future Genre"; The Computer Medium; Cambridge Unv. Press; pp. 263-283; 1993.

Lietzke, Ron; "On-line information Goes Off-Line, Too"; Columbus Dispatch; Jun. 3, 1994 (Joint 009889 to 009890).

Litigation materials from Case No. C 02-2878 (VRW), including Intuit Inc.'s Preliminary Invalidity Contentions (one page); Electronic Art Inc.'s Preliminary Invalidity Contentions (two pages); "Exhibit B" Prior Art Bibliography (four pages); and Intuit/EA/Symantec Prior Art tables (fifteen pages).

Liu Cricket et al.; "Managing Internet Information Services"; O'Reilly & Associates, Inc; pp. 279-298; Dec. 1994.

Louderback, Jim; "One man's mission: a CD ROM Drive in Every PC"; PC Week; vol. 9; No. 22; p. 70; Jun. 1992 (two pages).

Malnig, Anita; "Customers Build Their Own Mine Vehicles Via Multimedia"; MacWeek; vol. 7; No. 30; p. 42; Jul. 26, 1993 (two pages).

Mann, Richard; "Quicken 3 for Windows; Productivity Choice; Software Review; Evaluation"; Computel; vol. 16; No. 4; p. 76; Apr. 1994 (Joint 003773 to 003775).

Marcus, John; "Wilson Business Abstracts on CD-RoM for the Corporate Library"; Database; vol. 17; No. 3; pp. 52-55; Jun. 1994 (Joint 003776 to 003780).

Marshall, Patrick; "Multimedia Software; Microsoft Knows Multimedia and Flaunts it with Encarta CD-ROM"; InfoWorld; p. 113; Apr. 9, 1993 (two pages).

Mascha, Michael et al.; "Interactive Education: Transitioning CD-ROMs to the Web"; (Virtual Chimps); May 25-27, 1994.

Mascha, Michael; "Interactive Education: Transitioning CD-ROMs to the Web"; Computer Networks and ISDN Systems; vol. 27; No. 2; pp. 267-272; Nov. 1994.

Mazur et al.; "Joining Digital Hypermedia and Networking for Collaboration in Engineering Design: A Project's Early Consideration"; CD-ROM Professional; pp. 51-54; Mar. 1992.

McManus, Neil; "CD-ROM, online hybrids; compuServe's CompuServe CD"; Aug. 8, 1994 (Joint 009885 to 009886).

Microsoft; Microsoft Complete Baseball (Complete Baseball) and related documentation (with videos and CD disks); May 1994; (Joint 5027 to 5302; 5321 to 5389; 5401 to 5671; 6311 to 7519; 7540 to 7730; 7874, 7882 to 7885, 7887, 7888, 7891 to 7894, 7953 to 7957).

Money 3.0 Various Documents; Apr. 15, 1993 (Joint 5001 to 5026; 5303 to 5320; 5672 to 6310).

Murray, Rink; "Earl Weaver Baseball II; Software Review; one of four baseball simulation games reviews in '386 Down the Power Alleys"; PC Magazine; vol. 11; No. 8; p. 493; Apr. 26, 1992 (Joint 7903 to 7904).

Nelson, Nancy; "Connectivity: Let Them Eat Cake"; Information today; vol. 5; Issue 2; Feb. 1988 (five pages).

Nelson, Russell N.; Deposition transcript; Aug. 2003.

Nelson, Theodor Holm; "Literary Machines 90.1"; 1990 (three pages).

Nesbit, Kathryn; "BRS/Links to the Future: Online Hypertext is Born"; Online; vol. 14; No. 3; pp. 34-36; May 1990 (five pages).

Newcomb, Steven et al.; "The 'HyTime' Hypermedia/Time-based Document Structuring Language"; Communications of the ACM; vol. 34; No. 11; p. 67; Nov. 1991 (twenty-three pages).

Nicholls, Paul; "Assessing CD-ROM in Canada"; CD-ROM World; vol. 8; No. 5; p. 38; Jun. 1993 (eight pages).

Nickerson, Gord; "Mining for Gold"; CD-ROM Professional; pp. 128-132; Jan. 1994.

Nickerson, Gordon; "WorldWideWeb"; Computers in Libraries; vol. 12; No. 11; p. 75; Dec. 1992 (six pages).

Nielsen, Jakob; "Hypertext and Hypermedia"; 1993 (ten pages).

Nunn-Price, Norman; "The Link Between CD-Rom and Online"; Law Technology Journal; vol. 2; No. 2; at 13; (Justis Article); May 1993 (Joint 7855 to 7857).

O'Connor, Mary Ann; "Markup, SGML, and Hypertext for Full-Text Databases—Part III"; CD-ROM Professional; pp. 130-131; Nov. 1992.

Oben, Alta; "Review of Nautilus from May 1995 Monitor"; Jan. 14, 1994 (four pages).
Ogawa et al.; "Design Strategies for Scenario-based Hypermedia: Description of its Structure, Dynamics, and Style"; Proceeding of the ACM Conference on Hypertext; pp. 71-80; Nov. 30-Dec. 4, 1992 (eleven pages).
Packet Driver CD-ROM Documents (Joint 010302 to 010399).
Packet Drivers CD (Packet Drivers or PCD) and related documentation; Jan. 1994 (Joint 7878).
Packet.h; Jul. 19, 1993 (Joint 003860 to 003891).
Parkinson, Kirsten L.; "Nautilus CD Adds Magazine-Like Interface; Product Announcement"; MacWeek; vol. 7; No. 41; p. 12; Oct. 18, 1993 (Joint 003787 to 03788).
Pei Wei; ViolaWWW and related documentation; May 1992; (PW 000001 to PW 001091; Joint 004180 to 004193).
Powell, James; Adventures with the World Wide Web: Creating a Hypertext Library Information System; Database; vol. 17; No. 1; pp. 59-66; Feb. 1994.
Premise; Making the Easy Transition to Premise 1.41; (Joint 009713 to 009718).
Premise Notebook Screen Captures; (Joint 009719 to 009722).
Premise Quick Reference Card; (Joint 0009230 to 0009239; 009695 to 009704).
Premise; QuickScan on Premise; (Joint 009711 to 009712).
Premise Software; Training Course Enclosed; (Joint 009689 to 009694).
Premise Software; Version 1.2; 1989; (Joint 9723 to 9731).
Premise User Manual; 1991; (Joint 009240 to 009404).
Premise User Manual; 1992; (Joint 009405 to 009464).
Premise User Packet; Front and Back Cover; May 5, 1991; (Joint 009687 to 009688).
Quicken Deluxe product (Quicken Deluxe) and related documentation (including CD-ROM); Jan. 1994; (Joint 7873; 7915 to 7932; 7944 to 7952).
Quint, Barbara; "compact Cambridge/Cambridge Information Group; Cambridge Scientific Abstracts"; Database Searcher; vol. 8; No. 1; p. 20; Jan. 1992 (two pages).
Quint, Barbara; "Footsore Searcher Tours Online/CD-ROM '91 Exhibits: 'Day Three'"; Database Searcher; vol. 8; No. 2; p. 10; Feb. 1992 (nineteen pages).
Raggett, David; HTML+ (Hypertext Markup Language); pp. 1-31; WWW Discussion Group Request for Comments; Jul. 12, 1993.
Reality's "Wealth Builder 3.0 by Money Magazine"; User's Guide and floppy disks; 1992 (Joint 7911 to 7913; 7933 (twenty-six pages); 7934 (one hundred, fifty-eight pages); 7935 (User's Guide; three hundred, thirty-seven pages)).
Reference Manual Revised Edition; West CD Rom Libraries; 1989; (Joint 009465 to 9686).
Reisman, Richard R.; "CD-ROM/Online Hybrids, The Missing Link:?"; CD-ROM Professional; vol. 8; No. 4; Apr. 1995 (nine pages).
Rescorla, E. et al.; "The Secure HyperText Transfer Protocol"; Jun. 1994 (twenty-three pages).
Richman, Barry; "Online or Ondisc? When to Choose CD-ROM for your Database"; CD-ROM Professional; pp. 53-54; Mar. 1993.
Rogers, Scot P.; "Citations from Business Dateline Thru 1998: BD1"; Feb. 5, 2002 (thirty-eight pages).
Rogers, Scot P.; "Citations from INFORM:INF"; Feb. 5, 2002 (ten pages).
Rogers, Scot P.; "Citations from Promt-Predicasts:PM3"; Feb. 5, 2002 (four pages).
Rubenstein, Robert et al.; "CD-ROM Update: Tax Information of CD-ROM"; The Tax Adviser; No. 1; vol. 24; p. 59; Jan. 1993 (four pages).
Salamone, Salvatore; "Electronic software Distribution: Diamond in the Rough"; Data Communications; pp. 109-116; Mar. 1993 (Joint 003794 to 003799).
Scenarios 1-6 and SAM Screen Captives; (Jul. 1, 1993); (Joint 9216-9229).
Schneider, Marc; "What is Teletext?"; Philips Semiconductors Video Products; pp. 2-204 to 2-212; Jun. 1994 (nine pages).
Scisco, Peter; "Pigskin preview; computer football games; Software Review; Evaluation"; Computel; vol. 14; No. 6; p. 92; Sep. 1992 (Joint 7905 to 7910).
Sherman, Christopher V. et al.; "Exploring Hybrid World of CD-ROM/On-Line Products"; Multimedia Week; vol. 3; No. 10; Mar. 7, 1994 (Joint 7731 to 7738).
Simon, Barry; "Pipeline: Enter the Internet"; PC Magazine; p. 46; Feb. 8, 1994 (Joint 003811).
Slay, Alan L.; "Money Management Cures"; MacWorld; pp. 152-158; Mar. 1991 (Joint 003812 to 003818).
Smith Jr., Kime H. et al.; "Accessing Multimedia Network Services"; IEEE Communications Magazine; pp. 72-80; May 1992.
Software Dispatch CD and Related Documentation; 1993 (Joint 009734 to 009737).
Stangenes, Sharon; "'First' teams up with Microsoft on home banking"; Chicago Tribune; Nov. 19, 1993 (Joint 010826).
Steinberg, Jeffrey A.; "GeoQuery"; MacUser; vol. 8; No. 10; p. 58; Oct. 1992 (Joint 003831 to 003833).
Sugawara, Sandy; "Microsoft's very big ballpark estimate; Software giant's 'complete baseball' opens a window on its ambitious on-line plans"; Washington Post; p. C1; May 7, 1994 (Joint 003834 to 003836).
Swenson, John; "Banking through home computer has arrived"; Journal American; May 23, 1994 (Joint 010821).
Swenson, John; "Software you can bank on; Microsoft, U.S. Bank to put financial services within modem's reach"; Journal American; Dec. 7, 1993 (Joint 010825).
Symantec Antivirus for Macintosh 4.0 and related documentation (SAM 4.0); (Joint 001768 to 003650).
Unknown article; Wall Street & Technology; vol. 11; No. 5; p. 9 (Joint 3859).
USA Today; "Keyboards Dream Teams"; sec. Bonus; p. 4E; Aug. 30, 1991 (Joint 7896 to 7897).
Vaughn, Mary A. et al.; "Publishing on CD-ROM: The NautilusCD Experience"; CD-ROM Professional; vol. 7; No. 3; pp. 59-68; May/Jun. 1994 (Joint 003837 to 003843).
Vogt, Sjoerd; "CD-ROM and Online-competitors or Compatriots? An Online Host's Point of View"; Online Information 92; pp. 33-45 (David I. Raitt ed., $16^{th}$ International Online Information Meeting Proceedings, London, Dec. 8-10, 1992); (Joint 7858 to 7871).
Walnut Creek CD-ROM, FreeBSD (FCD) and related documentation; May 1994 (Joint 7877).
Walnut Creek CD-ROM, Internet Info CD-ROM; Mar. 1994 (Joint 7875).
Walnut Creek CD-ROM, Internet Info CDROM (Joint 8566).
Warner, Jack; "Sports Computer Games; Several new football games out"; The Atlanta Journal and Constitution; p. F2; Nov. 17, 1991 (Joint 7901 to 7902).
Warner, Paul D.; "Tax Services and Tax Forms on CD-ROM"; CPA Journal; at 48; Nov. 1993 (Joint 7752 to 7756).
Warner, Paul D.; "A Follow-up On CD-ROM Tax Services (The CPA & the Computer)"; The CPA Journal Online; Jan. 1995 (four pages).
Weinert, Bryan; "CD-ROM Technology, Past, Future"; Jan. 23, 2002 (three pages).
West's CD-ROM Communique Special Issue; Spring 1991 (Joint 009708 to 009710).
Windows Analytics; Wall Street & Technology; vol. 11; No. 11; p. 58 (Joint 3858).
"Here is Your Personal CD Code" Disk.
A New Playing Field: Indoor baseball like never before, and talk about artificial turf . . . ; The Seattle Times; May 29, 1994; pp. C1, C6.
Aaland; Microsoft's new field of dreams; Folio; Apr. 15, 1994.
Academic Press, Inc.; Academic Press Dictionary of Science and Technology; 1992; pp. 660, 1805, and 2151.
Alber; Videotex/Teletext: Principles & Practices; 1985; cover.
Alta Oben; Review of Nautilus from May 1995 Monitor; Feb. 27, 2002.
Ambrosius; Breaking New Ground: Franklin and Microsoft Enter the Fantasy Baseball Market With Innovative New Products; Fantasy Baseball; vol. 5, No. 3; May 1994.
Americ Disc Inc.; Advertisement "We're Crazy About Our Business . . . We Are Committed To You." Identified in Appendix B of Defendants' P.R. 3-3 Invalidity Contentions in *Disc Link* v. *H&R* Case No. 5:06-CV-00295-DF dated Nov. 1, 2007.

Americ Disc Inc.; CD-ROM Purchase Order Form to CD Publishing Corp.; Dec. 20, 1993.

Americ Disc Inc.; Facsimile from Frank Johansen to Mark Frass with CD Publishing Corporation CD-ROM Services Price List; May 31, 1994.

Americ Disc Inc.; Invoice No. 126225 to CD Publishing Corporation; Jan. 5, 1994.

Americ Disc Inc.; Procedure for Shipping Tapes, Films and Printed Matter. Identified in Appendix B of Defendants' P.R. 3-3 Invalidity Contentions in *Disc Link* v. *H&R* Case No. 5:06-CV-00295-DF dated Nov. 1, 2007.

America Online, Inc.; America Online: Welcome New Member, Version 2.0; 1994.

Anita Malnig; Customers Build Their Own Mine Vehicles Via Multimedia; Jul. 26, 1993.

Apple Computer, Inc.; Apple Developer Group; Jun. 15, 1989.

Apple Computer, Inc.; Apple Directions; The Developer Business Report; Aug. 1994.

Apple Computer, Inc.; Apple II, AppleLink Personal Edition Apple IIc Plus Addendum. (1988).

Apple Computer, Inc.; Apple II, AppleLink Personal Edition; Aug. 1988.

Apple Computer, Inc.; Apple Macintosh HyperCard User's Guide and HyperCard Quick Reference Card; 1987; pp. 1-221.

Apple Computer, Inc.; Apple Price List; Sep. 1, 1993.

Apple Computer, Inc.; Apple Reference and Presentations Library, Version 5.0, Reseller Edition. (1993).

Apple Computer, Inc.; Apple Remote Access Client User's Guide for Macintosh; (1993).

Apple Computer, Inc.; AppleLink 6.0 Ancillary Materials; 1990.

Apple Computer, Inc.; AppleLink 6.0 and 6.1 Source CDs.

Apple Computer, Inc.; AppleLink 6.0 User's Guide; 1990; pp. i-xi, 1-131.

Apple Computer, Inc.; AppleLink 6.0.

Apple Computer, Inc.; AppleLink 6.1 Program Disk 1; 1991.

Apple Computer, Inc.; AppleLink 6.1 Program Disk 2; 1991.

Apple Computer, Inc.; AppleLink 6.1 User's Guide Update; 1991.

Apple Computer, Inc.; AppleLink License Agreement.

Apple Computer, Inc.; AppleLink Personal Edition Connect Guide; 1988; pp. 1-38.

Apple Computer, Inc.; Developer's Handbook; 1984; pp. 1-32.

Apple Computer, Inc.; e-World; Version 1.0 Install Disk 1 and Disk 2; 1994.

Apple Computer, Inc.; Getting Started With AppleLink 6.0; 1990; pp. 1-19.

Apple Computer, Inc.; Getting Started With AppleLink 6.1; 1991; pp. 1-21.

Apple Computer, Inc.; Gorillas in The Disc, Apple Developer Group, Developer CD Series vol. VI; 1991; pp. 3-15.

Apple Computer, Inc.; HyperCard Basics; 1990; pp. 1-33.

Apple Computer, Inc.; HyperCard Information . . . It's All Over AppleLink!; AppleLink Ink; May 15, 1989.

Apple Computer, Inc.; Info Guide for AppleLink 6.0; 1990.

Apple Computer, Inc.; Info Guide for AppleLink 6.1; 1991.

Apple Computer, Inc.; Inside CCL: The AppleLink Communication Control Language Scripting Guide; 1990; pp. i-xiv, 1-312.

Apple Computer, Inc.; Macintosh AppleLink Apple Edition User's Guide AppleLink 6.0; 1990.

Apple Computer, Inc.; Outside Apple; May 1988.

Apple Computer, Inc.; Read Me First, AppleLink 6.0.

Apple Computer, Inc.; Read Me First, AppleLink 6.1; 1992.

Apple Computer, Inc.; Software Dispatch Free CD and Advertisement. Identified in Appendix B of Defendants' P.R. 3-3 Invalidity Contentions in *Disc Link* v. *H&R* Case No. 5:06-CV-00295-DF dated Nov. 1, 2007.

Apple Computer, Inc.; Software Dispatch User's Guide; 1993; pp. 1-10.

Apple Computer, Inc.; The Apple CD-ROM Handbook; Addison-Wesley Publishing Company; 1992; pp. 1-144.

Apple Computer, Inc.; The Developer Handbook: A Reference Guide to Development Programs and Services for Apple Developers, Third Edition; Apr. 1991.

Apple Computer, Inc.; The Hexorcist CD—Developer CD Series; Oct. 1992.

Aragon; Pitching Products; PC Week; Aug. 1, 1994.

Bain; Pinpointing differences between Atlas Pro, MapInfo; MacWeek; vol. 6, No. 10; Mar. 9, 1992.

Barbara Quint; Compact Cambridge/Cambridge Information Group; Cambridge Scientific Abstracts; Database Searcher; vol. 8, No. 1; Jan. 1992; p. 20.

Barbara Quint; Footsore Searcher Tours Online/CD-ROM '91 Exhibits: "Day Three"; Database Searcher; vol. 8, No. 2, Feb. 1992; p. 10.

Barr; Buy? hold? sell? MarketArts Windows on Wall street; PC Magazine; vol. 13, No. 11; Jun. 14, 1994.

Barret; Sampling the Content; Seybold Report on Desktop Publishing; vol. 8, No. 8; Seybold Publication; 1996.

Berners-Lee, Weaving The Web: The Original Design and Ultimate Destiny of the World Wide Web By Its Inventor; 1999; pp. 22-23, 28-31, 45-51.

Berners-Lee, Weaving The Web: The Original Design and Ultimate Destiny of the World Wide Web By Its Inventor; 1999; pp. 4-6, 13-23, 56, 64.

Bond; Banks hope their customers plug in to on-line billpaying; The Dallas Morning News; Sep. 18, 1994.

Borgstrom et al.; WilsonDisc's MLA on CD-ROM; CD-ROM Professional; vol. 3, No. 5; Sep. 1990; pp. 64-68.

Braunagel; The natural: baseball and computers Programs cater to statistics lovers, fantasy leaguers, fans of all kinds; The San Diego Union-Tribune; Apr. 12, 1994.

Brian Weinert; CD-Rom Technology. Past, Future; Jan. 23, 2002.

British National Libraries Project.

British National Libraries Project.

Bryant; Combining Online and Disc; Online & CDROM Review; vol. 17, No. 6; Dec. 1993.

Burr; Field of Screens; Entertainment Weekly; No. 235; Aug. 12, 1994.

Burrill; You can be the manager with these baseball games; The Toronto Star; Aug. 31, 1991; LIFE section; p. 4F.

C. Brown; Net 286 Gazette Online Magazine; Sep. 25, 1993.

CD Publishing Corporation; Brochure.

CD Publishing Corporation; CD Publishing Spec Sheet: Packet Driver CD: The Crynwr library!.

CD Publishing Corporation; Facsimile from Mark Frass to Nancy Gauthier, Americ Disc with Purchase Order; Dec. 20, 1993.

CD Publishing Corporation; Invoice No. 1000015 to Doug Veldbuisea; Jan 9, 1994.

CD Publishing Corporation; Invoice No. 1000016 to Richard Smith; Jan. 9, 1994.

CD Publishing Corporation; Invoice No. 1000019 to Wolfgang Fahl; Jan. 9, 1994.

CD Publishing Corporation; Invoice No. 1000020 to Tim Evans; Jan. 9, 1994.

CD Publishing Corporation; Invoice No. 1000096 to Bernd Sommerfeld; Mar. 28, 1994.

CD Publishing Corporation; Invoice No. 1000129 to Anthony Sanders; Jun. 15, 1994.

CD Publishing Corporation; Invoice No. 1000129 to Gary Seabridge; Jun. 15, 1994.

CD Publishing Corporation; Invoice No. 1000133 to Bernd Sommerfeld; Jun. 19, 1994.

CD Publishing Corporation; Invoice No. 1000134 to Hans-Günther Willers; Jun. 25, 1994.

CD Publishing Corporation; Invoice No. 1000135 to Bernd Sommerfeld; Jun. 19, 1994.

CD Publishing Corporation; Invoice No. 1000137 to Sang Shin; Jun. 30, 1994.

CD-ROM With Baseball Daily Online To Hit Stores as Microsoft Home's First Complete Sports Software; Comprehensive, Multimedia Guide to America's Favorite Pastime Is an Official Publication of Major League Baseball; Business Wire; Jun. 10, 1994.

Charles Bermant; Enhanced CD's Promise to Redefine Liner Notes; Feb. 20, 2002.

CheckFree Advertisements.
Christopher Barr; On-line to Tomorrowland; PC Magazine; Jan. 25, 1994; p. 30.
Clay Andres; Authoring Tools Help Developers Deliver Multimedia Message on CD; Dec. 6, 1993.
Column: Windows Analytics; Wall Street & Technology.
Commerce Clearing House, Inc.; Access CD-Rom Extend Quick Reference; 1993.
Commerce Clearing House, Inc.; Access Tax Research Series, CCH Access CD-ROM User Guide; 1993.
Compact Disc: America Online For Windows, Version 2.0.
Compact Disc: Apple Desktop Services, Wishing Well CD Fall 1991.
Compact Disc: Apple Desktop Services, Wishing Well CD Summer 1991.
Compact Disc: Apple Reference & Presentations Library Fall '91.
Compact Disc: Apple Reference & Presentations Library v7.0 Mar. 1991.
Compact Disc: Apple Reference & Presentations Library v8; Identified in Appendix B of Defendants' P.R. 3-3 Invalidity Contentions in *Disc Link* v. *H&R* Case No. 5:06-CV-00295-DF dated Nov. 1, 2007.
Compact Disc: Apple Reference & Presentations Library Winter '91-'92.
Compact Disc: Apple, Technical Information Source, Version 3.0 (1992).
Compact Disc: Apple, TIS 3.0, Hybrid (1992).
Compact Disc: Archival Viola WWW Material, Viola 1994.
Compact Disc: CD-Access Macintosh Version; Identified in Appendix B of Defendants' P.R. 3-3 Invalidity Contentions in *Disc Link* v. *H&R* Case No. 5:06-CV-00295-DF dated Nov. 1, 2007.
Compact Disc: Dialog OnDisk Miami Herald 1992.
Compact Disc: Federal Reporter, WPC06401, Mar. 1994, West Publishing Company.
Compact Disc: Federal Reporter, WPC06402, Mar. 1994, West Publishing Company.
Compact Disc: Federal Reporter, WPC06413, Jan. 1994, West Publishing Company.
Compact Disc: Federal Reporter, WPC06417, Jan. 1994, West Publishing Company.
Compact Disc: Federal Reporter, WPC06418, Jan. 1994, West Publishing Company.
Compact Disc: Federal Reporter, WPC06501, Apr. 1994, West Publishing Company.
Compact Disc: Federal Reporter, WPC06502, Apr. 1994, West Publishing Company.
Compact Disc: Federal Reporter, WPC06507, Feb. 1994, West Publishing Company.
Compact Disc: Federal Reporter, WPC06508, Feb. 1994, West Publishing Company.
Compact Disc: Infomac III (1994).
Compact Disc: Internal & External Beta, Folio Library Management & Online Link/ Access Plus 3.1 Beta Test Drive, REV.1 Nov. 30, 1992.
Compact Disc: National Libraries Project on CD-ROM (Diskette) (1990-1993).
Compact Disc: Nautilus Jul. 1993, vol. 4-7, Macintosh Edition.
Compact Disc: Nautilus Jul. 1993, vol. 4-7, Macintosh Edition.
Compact Disc: Nautilus Sep. 1993, vol. 4-9, Macintosh Edition.
Compact Disc: New Mexico Law on Disc, Feb. 1994.
Compact Disc: OnPoint Federal Tax Coordinator, Disc 1.
Compact Disc: OnPoint REL Dec. 10, 1991 Release.
Compact Disc: OnPoint REL 92-5; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 92-1, 1991 Archive.
Compact Disc: OnPoint REL 92-10; Identified in Appendix B of Defendants' P.R. 3-3 Invalidity Contentions in *Disc Link* v. *H&R* Case No. 5:06-CV-00295-DF dated Nov 1, 2007.
Compact Disc: OnPoint REL 92-11; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 92-12; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 92-2; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 92-3; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 92-4; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 92-6; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 92-7; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 92-8; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 92-9; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 93-1, 1992 Archive.
Compact Disc: OnPoint REL 93-2; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 93-3, System 3.0; Identified in Appendix B of Defendants' P.R. 3-3 Invalidity Contentions in *Disc Link* v. *H&R* Case No. 5:06-CV-00295-DF dated Nov. 1, 2007.
Compact Disc: OnPoint REL 93-4, System 3.0 1993.
Compact Disc: OnPoint System 3.0 1993 Archive.
Compact Disc: OnPoint System 3.0, Beta Release, Dec. 29, 1992.
Compact Disc: Premise Version 1.2, West Publishing Company. Identified in Appendix B of Defendants' P.R. 3-3 Invalidity Contentions in *Disc Link* v. *H&R* Case No. 5:06-CV-00295-DF dated Nov. 1, 2007.
Compact Disc: Premise Version 1.45, West Publishing Company. Identified in Appendix B of Defendants' P.R. 3-3 Invalidity Contentions in *Disc Link* v. *H&R* Case No. 5:06-CV-00295-DF dated Nov. 1, 2007.
Compact Disc: Premise Version 1.50, West Publishing Company. Identified in Appendix B of Defendants' P.R. 3-3 Invalidity Contentions in *Disc Link* v. *H&R* Case No. 5:06-CV-00295-DF dated Nov. 1, 2007.
Compact Disc: Software Dispatch. Identified in Appendix B of Defendants' P.R. 3-3 Invalidity Contentions in *Disc Link* v. *H&R* Case No. 5:06-CV-00295-DF dated Nov. 1, 2007.
Compact Disc: Tax Research Series, Standard Federal Tax Reporter, Jan.-Dec. 1993.
Compact Disc: The Hexorcist, Oct. 1992.
Compact Disc: Viola Emails & Demo From UCB Subp 94 1993-1994.
Complete Baseball Editorial Coverage listing (1994).
Complete Baseball Materials Including Editorial Coverage; New York Times; Jun. 27, 1994.
CompuServe Inc.; CompuServ Introductory Membership; 1993; pp. 1-31.
CompuServe Inc.; CompuServe CD; CompuServe CD goes to Extremes; Issue #495W Windows Edition; 1995.
CompuServe Inc.; CompuServe CD; Multimedia Comes to CompuServe, MIDI Music Issue; Issue #194W Windows Edition; Jul./Aug. 1994.
CompuServe Inc.; CompuServe CD; Multimedia Comes to CompuServe; Pilot Issue #094 W Windows Edition; May 1994.
CompuServe Inc.; CompuServe IntroPak; 1986; pp. 1-44.
CompuServe Inc.; Dear Reader, Article "Introducing CompuServeCD" and advertisement "We've added a new curve to the information highway"; CompuServe Magazine; Jul. 1994; p. 16.
CompuServe Inc.; Dear Reader; CompuServe Magazine; May 1994; p. 3.
CompuServe Inc.; Screen Shots of "What's New"; Jan. 21, 1994.
CompuServe Incorporated and Metatec Corporation Announce Strategic Alliance; PR Newswire; Sep. 20, 1993.
CompuServe; CompuServe Cinema Package.

Connect with Nautilus CD; Jun. 1994.
Cooper; About Face: The Essentials of User Interface Design; IDG Books Worldwide, Inc.; 1995; pp. 229-246.
Corr; Microsoft is expanding retail markets; The Seattle Times; Jun. 6, 1994.
Cricket Liu, et al.; Managing Internet Information Services; O'Reilly & Associates, Inc.; Dec. 1994.
Database Management; Software Review; Software for Apple Macintosh Computers, Evaluation, MacUser; vol. 8, No. 13; Jan. 1993.
David Guenette; I've Got a Line On a Secret; CD-ROM and Online Technologies Merging to Create Hybrid Format; Information Access Company, ASAP, Pemberton Press Inc.; Jul. 1, 1995.
David Raggett; HTML (Hypertext Markup Language); WWW Discussion Group Request for Comments; Jul. 12, 1993.
David Raggett; HTML+(Hypertext Markup Language); WWW Discussion Group Request for Comments; Jul. 12, 1993; pp. 1-31.
Dialog Corp.; Dialog on Disc; and related demonstrations; Jan. 1993.
Dialog Corp.; Dialog OnDisc. And related documentation; Jan. 1992.
Dialog Information Services, Inc.; Dialog OnDisc User's Guide, Version 4.0 for DOS; Jul. 1993.
Dialog OnDisc Links: CD-ROM and Online Providing a Complementary Service; Jun. 1989.
DISCC (Compact Disc). Identified in Appendix B of Defendants' P.R. 3-3 Invalidity Contentions in *Disc Link* v. *H&R* Case No. 5:06-CV-00295-DF dated Nov. 1, 2007.
Dunphy; The Seattle Times; Mar. 3, 1994.
E-Mail from be@stardiv.de to info@CDPublishing.com; Nov. 30, 1993.
E-Mail from davids@cofemz.gov.ar to info@CDPublishing.com; Dec. 8, 1993.
E-Mail from fahl@sesq1.dwh1.de to info@CDPublishing.com; Dec. 2, 1993.
E-Mail from info@CDPublishing.com to JeffR@nova.cd.com; Jan. 26, 1994.
E-Mail from Man McLennan to info@CDPublishing.com; Nov. 22, 1993.
E-Mail from NEgaard@Jayne.Graceland.edu to skl@connectivity.com; Dec. 13, 1993.
E-Mail from Peter W. D. Broadbent to info@CDPublishing.com; Dec. 10, 1993.
E-Mail from Robert A. Bruce to Newsgroup comp.newprod re Internet Info CDROM—FAWx, RFCs, docs, etc.; Apr. 5, 1994.
E-Mail from Robert Bruce to Lillian C. Henry re Free BSD/Internet Info; Sep. 3, 2003.
E-mail from Robert Bruce to Michelle M. Umberger re Free BSD/InternetInfo; Sep. 3, 2003.
E-Mail from Russell Nelson to Samuel Lam re Decision Needed; Sep. 26, 1993.
E-Mail from Stan Taylor to info@CDPublishing.com; Nov. 30, 1993.
E-Mail from Uenal_Mutlu@rci.fido.de; Nov. 29, 1993.
E-Mail from usinet!brooks@uunet.uu.net to info@CDPublishing.com; Nov. 23, 1993.
E-Mails from Russell Nelson; 1994.
E-Mail from Samuel Lam to Mark Frass re Russ Nelson's Story; Jun. 1, 1994.
Eis; Directory of Law-Related CD-ROMs; Infosources Publishing; 1994; pp. 1-171.
Enbyst; Banking at home: New software gives access via computer; Journal Am; Feb. 11, 1994.
Engst et al; Internet Explorer Kit for Macintosh; Hayden Books; 1994; pp. i-xvi, 1-446.
Engst; The Internet Starter Kit for Macintosh, Second Edition; Hayden Books; 1994; pp. I-XXVIII, 1-990.
Falkner; Secrets to Success; The Sporting News; Jun. 27, 1994.
File Folder-PR 125 A112 Apple Computer Inc.-Letter and Encrypted Software Distribution and Vending Agreement. Identified in Appendix B of Defendants' P.R. 3-3 Invalidity Contentions in *Disc Link* v. *H&R* Case No. 5:06-CV-00295-DF dated Nov. 1, 2007.
File History for U.S. Appl. No. 08/224,280, filed Apr. 7, 1994 entitled Efficient Cryptographic Methods and Devices.
File History for U.S. Appl. No. 08/279,424, filed Jul. 25, 1994 entitled Information Distribution System.
File History for U.S. Appl. No. 08/644,838, filed May 10, 1996 entitled Information Distribution and Processing System.
File History for U.S. Patent No. 5,467,255, U.S. Appl. No. 08/225,649, filed Jun. 8, 1994 entitled Information Distribution and Processing System.
File History for U.S. Patent No. 6,021,307, U.S. Appl. No. 08/939,368, filed Sep. 29, 1997 entitled Information Distribution and Processing System.
File History for U.S. Patent No. 6,314,574, U.S. Appl. No. 09/188,157, filed Nov. 8, 1998 entitled Information Distribution System.
File History of US Pat No. 5,157,783 (U.S. Appl. No. 07/160,959).
File History of US Pat No. 5,694,546 (U.S. Appl. No. 08/251,724).
Fisher et al.; Riding the Internet Highway, Deluxe Edition; New Riders Publishing; 1994; pp. i-xv, 1-381.
Flynn; There's no place like home: Microsoft's Patty Stonesifer creates hot CD-ROMs for families; U.S. News & World Report; Apr. 25, 1994.
Fraase; The PC Internet Tour Guide: Cruising the Internet the Easy Way; Ventana Press; 1994; pp. i-xxiv, 1-284.
FT adds features, loses manager; Information World Review, No. 84; Sep. 1993.
Gail L. Bower; CD-Rom. EDI, and pas: Power-com-2000; Jul.-Aug. 1994.
Gary Baker; The Mac Internet Tour Guide; Jan. 1994.
Gautier, et al; Automatic Program Recording System; Radiodiff et TV; Nov. 1975.
Gelmis; '90s Film School; Newsday; Jun. 17, 1994.
Genigraphics Corporation; Genigraphics Frames of Reference; 1990.
Genigraphics Corporation; Genigraphics Service Card; 1988.
Genigraphics Corporation; Genigraphics The Worry-Free Solution for Dazzling Presentations; 1989.
Getting Multimedia From a Kit; May 1993.
Global Village Communication, Inc.; GlobalFax User's Guide; 1995.
Global Village Communication; Global Village Communication PowerPort Series User's Guide; 1992.
Godin; Point & Click Internet, Macintosh Edition; Peachpit Press, Inc.; 1994; pp. 1-103.
Goldfarb; The SGML Handbook; 1990.
Google NewsGroup from info@CDPublishing.com to comp.newprod re New DOS/Windows TCP/IP CD-ROM (Packet Driver, WinSock & TCP/IP); Feb. 15, 1994.
Gord Nickerson; Mining for Gold; Jan. 1994.
Gordon Nickerson; WorldWideWeb; Computers in Libraries; vol. 12, No. 11; Dec. 1992; p. 75.
Graham W. Robinson ; RFC1436 (gopher); CD Publishing Corporation; Mar. 1993.
Griffith; The Federal Register on CD-ROM; Information Today; vol. 9; No. 11; Dec. 1992; pp. 32-34.
Guenette; The CD-ROM; CD-ROM Professional; Mar. 1996.
Gunnar Liestol; Hypermedia Communication and Academic Discourse: Some Speculations on a Future Genre, 1993.
Handwritten notes by Russell Nelson; Dec. 1, 1993.
Hara Yoshiko; Consortium Eyes Satellite-Based-E-Book System; Electronic Engineering Times; Oct. 1998.
Hiestand; Around New York, stadiums plan to double as theme parks; USA Today; May 10, 1994.
Houghton Mifflin Company; The American Heritage Collection Dictionary, Third Edition; 1993; p. 3.
How money programs compare; SJM News; Oct. 9, 1994; p. E4.
IBM Corp; Link Class Hierarchy Design; IBM Technical Disclosure Bulletin; vol. 34, No. 9; Feb. 1992; pp. 166-167.
IBM; Automatic Hypermedia Link Generation; IBM Technical Disclosure Bulletin; vol. 35, No. 1a; Jun. 1992.
IBM; Fully-Digital GML-Based Authoring and Delivery System for Hypermedia; IBM Technical Disclosure Bulletin; vol. 35, No. 2; Jul. 1992.
IBM; Local Area Network Program Distribution Facility; IBM Technical Disclosure Bulletin; vol. 33, No. 5; (Oct. 1990).
IEEE Inc.; The New IEEE Standard Dictionary of Electrical and Electronic Terms, Fifth Edition; 1993; 147, 304, 369, 726-727.
Information Today; Feb. 1988.

Intuit Inc.; Advertisement and related material, Quicken for Windows CD-ROM Deluxe Edition related material; 1993.
Intuit Inc.; Quicken for Windows CD-ROM Deluxe Edition CD-ROM disk only Windows and related material; 1993.
Intuit Inc.; Quicken for Windows CD-ROM Deluxe Edition related material; 1993.
Intuit Prospectus for 1,500,000 Shares Common Stock; Feb. 3, 1993.
Jakob Nielsen; Hypertext and Hypermedia; 1993.
James Kobielus; Look Before Leaping Into- Internet Electronic Commerce; Network World; Feb. 28, 1994; p. 32.
James Powell; Adventures with the World Wide Web: Creating a Hypertext Library Information System; Database; vol. 17, No. 1; Feb. 1994; p. 59.
Jasco; CompuServe does CD-ROM; Information Today; vol. 11, No. 9; Oct. 1994.
Jim Louderback; One man's mission: a CD ROM Drive in Every PC; PC Week; vol. 9, No. 22; Jun. 1992; p. 70.
John P. Hayes; Computer Architecture and Organization; Jan. 1988; pp. 398-421.
Karl Beiser; What a difference a year makes: CD-ROM developments; Online; vol. 17, No. 3; May 1993; p. 109.
Kasten; Microsoft Corporation, Industry Announcements, From the Intermedia 94 Conference, Mar. 1-3, San Jose, CA; Multimedia Monitor; vol. XII, No. 4; Apr. 1994.
Kathryn Nesbit; BRS/Links to the Future: Online Hypertext is Born; May 1990.
Kazman; Structuring the Text of the Oxford English Dictionary through Finite State Transduction; Jun. 1986; pp. i-viii, 1-117.
Keizer; Digital Dollars & Silicon Cents; PC Magazine; Jan. 25, 1994.
Keizer; MECA's Managing Your Money breaks into the Windows market; PC Magazine; vol. 13, No. 12; Jun. 28, 1994; p. 37.
Keizer; Money matters: PC Personal-Finance Packages; Computer Shopper; Aug. 1994; pp. 522-526, 528, 82.
Kevin Moran; Internal WGL/RIA memorandum re "Feb. 1993 Monthly Operating Report, Product Development & Production"; Feb. 22, 1993.
Keyboards dream teams; USA Today; Aug. 30, 1991.
Kim; Interactive Attractions: Or how to play sports games with your computer—a primer for technotyros; Sports Illustrated; Jun. 27, 1994.
Kime H. Smith, Jr.; Accessing Multimedia Network Services; May 1992.
Kristof; Breathing new life into home banking: Computer, TV and phone hookups are new ways of visiting the teller's window; Chicago Tribune; Jan. 4, 1994.
Landis et al.; Baseball Daily; USA Today; Jun. 9, 1994.
Landis; With CD-ROM, books speak volumes; USA Today; Mar. 3, 1994.
Laura Fillmore; Internet Publishing: How We Must Think; Dec. 7, 1993.
Laurie Flynn; CD-ROMs: They're Not Just for Entertainment; Apr. 24, 1994.
Letter from JF Lehmanns Med Buchhandlung GmBH to CD Publishing Corporation re: invoice settlement; Jul. 21, 1994.
Lewis; In Cyberspace, a High-Tech League of Their Own; The New York Times; Apr. 5, 1994.
Lewis; Technology for baseball fans creating a big league market; The Houston Chronicle; Apr. 10, 1994.
Library for Psychiatrists: American Psychiatric Press Inc.'s CD-ROM Library; Information Today; vol. 10, No. 6; Jun. 1993; p. 30.
Lichty; America Online's Internet, Windows Edition; Ventana Press; 1994; pp. i-xxxiv, 1-272.
Lietzke; On-Line information goes off-line, too; The Columbus Dispatch; Jun. 3, 1994.
Longley et al; Van Nostrand Reinhold Dictionary of Information Technology, Third Edition; (1969) pp. 424 and 502.
Macroeconomic Equity System; Wall Street & Technology; vol. 11, No. 11. Identified in Appendix B of Defendants' P.R. 3-3 Invalidity Contentions in *Disc Link* v. *H&R* Case No. 5:06-CV-00295-DF dated Nov. 1, 2007.
Mallory; Microsoft's Complete Baseball Will Download Stats; Newsbytes News Network; Mar. 22, 1994.

Manes; New Baseball Disk: Hits and Errors; The New York Times; Jun. 7, 1994.
Mann; Quicken 3 for Windows; Compute!; vol. 16, No. 4; Apr. 1994.
Marc Andreessen; New X-based Information Systems Browser Available; Feb. 16, 1993.
Marcus; Wilson Business Abstracts on CD-ROM for the corporate library; Database; vol. 17, No. 3; Jun. 1994.
Market House Books Ltd.; Dictionary of Computing, Third Edition; Oxford University Press; 1990; pp. 110-111.
Mary Ann O'Connor; Markup, SGML, and Hypertext for Full-Text Databases-Part III; Nov. 1992.
Mascha et al; Interactive Education Transitioning CD-ROMs to the Web; Prepared for WWW94 The First International Conference on the World Wide Web; May 25-27, 1994, Cern, Geneva.
Mazur et al.; Joining Digital Hypermedia and Networking for Collaboration In Engineering Design: A Project's Early Consideration; Mar. 1992.
McCullough; The Sports Locker; Computer Games Strategy Plus; Issue 20; Jul. 1992; pp. 64-67.
McCullough; Two's Company: The column for the well connected; Computer Games Strategy Plus; Issue 33; Aug. 1993.
McGraw-Hill Inc.; IBM Dictionary of Computing; 1994; 121, 165, 167, 517, 557, 651, and 667.
McManus; CD-ROM, Online Hybrids: Compuserve's CompuServe CD; Digital Media; vol. 4, No. 3; Aug. 8, 1994.
Memorandum from M. Horton, AT&T Bell Laboratories and R. Adams, Center for Seismic Studies; Standard for Interchange of USENET Messages; Dec. 1987; pp. 1-19.
Metatec Corporation; "NautilusCD" listing Multimedia Magazine personnel and providing subscription information; 1993.
Metatec Corporation; Metatec's NautilusCD Backpac vol. 6, Macintosh Edition (Issues 4-7 through 4-12); 1990, 1991, 1992, 1993, 1994.
Metatec Corporation; Metatec's Nautilus CD; 1995.
Meyer, The 'On-Line' War Heats Up; Newsweek; Mar. 28, 1994.
Meyer; On-Line Drive; Information Week; Mar. 28, 1994.
Meyerson; Up-to-the-Minute Baseball News; Electronic Entertainment; Jun. 1994.
Microsoft aims at baseball market; United Press International; Jun. 10, 1994.
Microsoft Continues Home Momentum With Nine New Products; Showcases New Products and Previews First Online Enhancement to CD-ROM Product; Business Wire; Mar. 1, 1994.
Microsoft Corporation; Advertisement "Transform your Home Computer with the Microsoft Home Collection" for Microsoft Bookshelf 94, Microsoft Money 3.0, Microsoft Works for Windows 3.0, and Microsoft Works for Macintosh 4.0; 1994.
Microsoft Corporation; Advertisement for Microsoft Complete Baseball "Turn your computer into a baseball Hall of Fame", Microsoft Home; 1994.
Microsoft Corporation; Advertisement for Microsoft Complete Baseball "We're holding tryouts for Microsoft Complete Baseball", Microsoft Home (Chicago Cubs); May 3, 1994.
Microsoft Corporation; Advertisement for Microsoft Complete Baseball "We're holding tryouts for Microsoft Complete Baseball", Microsoft Home (Mariners); 1994.
Microsoft Corporation; Baseball Daily Complementary Account; 1994.
Microsoft Corporation; Explore the Microsoft World of Sports and Games (1994).
Microsoft Corporation; Microsoft Advertisement for Microsoft Complete Baseball, Microsoft Home 1994 Edition (with Phillies and Blue Jays); 1994.
Microsoft Corporation; Microsoft CD-ROM Yearbook: 1989-1990; pp. 163-170; 1990.
Microsoft Corporation; Microsoft Complete Baseball (Complete Baseball) and related documentation; May 1994.
Microsoft Corporation; Microsoft Complete Baseball 1994 Edition Overview of Product; In-store availability Jun. 1994.
Microsoft Corporation; Microsoft Complete Baseball CD, 1994 Edition, including CD case insert, Microsoft License Agreement for Microsoft Complete Baseball 1994 for Windows on CDROM; Microsoft Baseball Daily information, and product registration cards; 1994.
Microsoft Corporation; Microsoft Complete Baseball CD-ROM With Baseball Daily Online to Hit Stores as Microsoft Home's First Complete Sports Software; Microsoft News Release; Jun. 10, 1994.
Microsoft Corporation; Microsoft Complete Baseball Spring Training Manual 1994 Edition; 1994.
Microsoft Corporation; Microsoft Money Training Version 3.0 Windows Setting Instructor's Guide; 1991-1994.
Microsoft Corporation; Microsoft Office Standard, Version 4.2; 1994.
Microsoft Corporation; Microsoft PowerPoint: Using PowerPoint and Genigraphics Desktop Presentation Services; 1988.
Microsoft Corporation; The Microsoft Home Software Catalog, Microsoft Home; Summer 1994.
Microsoft Has 9 New Products; Newsbytes News Network; Mar. 4, 1994.
Microsoft Press Computer Dictionary, Second Edition: The Comprehensive Standard for Business, School, Library, and Home; 1994; pp. 70, 88, 105, 356.
Microsoft Press Computer Dictionary, Second Edition: The Comprehensive Standard for Business, School, Library, and Home; 1994; p. 353.
Mitzman; Play ball; Eastsideweek; Mar. 23, 1994.
Money 3.0 Various Documents; Identified in Appendix B of Defendants' P.R. 3-3 Invalidity Contentions in *Disc Link* v. *H&R* Case No. 5:06-CV-00295-DF dated Nov. 1, 2007.
Mossberg; Baseball, Computers Team Up to Score With Stats Software; The Wall Street Journal; Apr. 28, 1994.
MPG-Net, Inc; Advertisement for MPG-NET "A Whole New Dimension In Entertainment"; Computer Games Strategy Plus; No. 39; Feb. 1994.
Multimedia Direct; CompuServeCD; Identified in Appendix B of Defendants' P.R. 3-3 Invalidity Contentions in *Disc Link* v. *H&R* Case No. 5:06-CV-00295-DF dated Nov. 1, 2007.
Nelson; Literary Machines, Edition 87.1; 1980.
New CompuServe CD ROM Brings the Power of Multimedia to Online Computing; CompuServe News Release; Jun. 1, 1994.
Newsbytes Daily Summary; Newsbytes News Network; Mar. 22, 1994.
Nielsen; Multimedia and Hypertext: The Internet and Beyond; Academic Press, Inc.; 1995; pp. 150-151.
Noam Chomsky; Online or Ondisc? When to Choose CD-ROM for your Database; Mar. 1993.
Nunn-Price; The Link between CD-ROM and Online; Law Technology Journal; vol. 2, No. 2; May 1993.
Ogawa et al.; Design Strategies for Scenario-based Hypermedia: Description of its Structure, Dynamics, and Style; Nov. 30-Dec. 4, 1992.
Online banking popular; Journal Am; Jun. 30, 1994.
Packet Driver Applications; CD Publishing Corporation; 1991.
Packet.h. (Compact Disc); Identified in Appendix B of Defendants' P.R. 3-3 Invalidity Contentions in *Disc Link* v. *H&R* Case No. 5:06-CV-00295-DF dated Nov. 1, 2007.
Parkinson; Nautilus CD adds magazine-like interface; Metatec Corp. introduces NautilusCD electronic magazine; MacWeek; vol. 7, No. 41; Oct. 18, 1993; p. 12.
Patrick Marshall; Multimedia Software: Microsoft Knows Multimedia and Flaunts it with Encarta CD-ROM; Info-World; Apr. 9, 1993; p. 113.
Paul Nicholls; Assessing CD-ROM in Canada; CD-ROM World; vol. 8, No. 5; Jun. 1993; p. 38.
Peter Jasco; Online Updates Keep CD-ROM Current; Information Access Company, ASAP, Information Today, Inc.; Nov. 1, 1995.
Premise Software User; West Publishing Co.; 1989.
Prodigy Services Company; "Get Started Now" set up and installation of disk instructions re Prodigy Interactive Personal Service. Identified in Appendix B of Defendants' P.R. 3-3 Invalidity Contentions in *Disc Link* v. *H&R* Case No. 5:06-CV-00295-DF dated Nov. 1, 2007.
Prodigy Services Company; Prodigy Interactive Personal Service Start-up Kit; 1991.

Prodigy Services Company; Prodigy Interactive Personal Service Start-up Kit Phone Book; Aug. 30, 1991.
Prodigy Services Company; The Handbook for Prodigy Interactive Personal Service; 1990-91.
Random House, Inc.; Random House Unabridged Dictionary, Second Edition; 1993; pp. 1926 and 1958.
Raskin; Taxing Times; PC Magazine; Jan. 25, 1994.
Raymond et al.; Hypertext and the New Oxford English Dictionary; Hypertext '87 Papers; Nov. 1987 pp. 143-153.
Reality Technologies Inc.; Advertisement and related material, Reality's WealthBuilder 3.0 by Money Magazine, IBM Version; 1993.
Reality Technologies Inc.; User Guide, Reality's WealthBuilder 3.0 by Money Magazine, IBM Version; 1992; pp. 1-325.
Reality Technologies Inc.; WealthBuilder Version 3.1 Supplement, Reality's WealthBuilder 3.0 by Money Magazine, IBM Version; Apr. 1993; pp. 1s-3s, 59s-85s, 141s-229s, 255s-268s+, 301-308s, 315s-325s. Identified in Appendix B of Defendants' P.R. 3-3 Invalidity Contentions in *Disc Link* v. *H&R* Case No. 5:06-CV-00295-DF dated Nov. 1, 2007.
Registrar of Companies, British Columbia, Canada; Company Act for CD Publishing Corporation with Certificate of Change of Name dated Mar. 4, 1993, Certificate of Incorporation dated Dec. 18, 1987 and Articles; Aug. 28, 2002.
Reisman; CD-ROM/Online Hybrids The Missing Link?; CD-ROM Professional; vol. 8, No. 4; Apr. 1995.
Research Institute of America Inc.; OnPoint for Novell Network; 1994.
Reviews/Products Comparison; InfoWorld; Dec. 7, 1992; p. 86 (24 sheets).
Richard Danca; MapBox Marries CD-ROM, Satellite Positioning; Federal Computer Week; Apr. 29, 1991.
Riger et al.; The Challenge of CD-ROM Technology to Online Databases in Law Firm Libraries: An Overview of the Rise and Current Troubles Facing Legal Databases; 14th National Online Meeting Proceedings; 1993; pp. 349-354.
Rink; Earl Weaver Baseball ll; Software Review; one of four baseball simulation games reviews in '386 Down the Power Alleys'; PC Magazine; vol. 11, No. 8; Apr. 28, 1992.
Robert Rubenstein and William Wasserman; CD-ROM Update: Tax Information of CD-ROM; The Tax Adviser; vo. 24, No. 1; Jan. 1993; p. 59.
Ropiequet et al.; CD ROM Optical Publishing; vol. 2; Microsoft Press; 1987; Chapter 5; pp. 63-82.
S&P and Dialog introduce company information on CD-ROM; Standard & Poor's Corp., CD-ROM Disc; Information Today; vol. 5, No. 6; Jun. 1998; p. 22.
S. Deering; Host Extensions for IP Multicasting; Network Working Group, Request for Comments: 1112; Aug. 1989.
Salamone; Electronic Software Distribution: Diamond in the Rough; Data Communications; Mar. 1993; pp. 109-116.
Schlosberg; The Joys of Summer; HomePC; Aug. 1994.
Scisco; Pigskin preview; computer football games; Compute!; vol. 14, No. 8; Sep. 1992.
Sengstack; The Sporting Life; CD-ROM World; Jul./Aug. 1994.
Sherman et al.; Exploring Hybrid World of CD-ROM/On-Line Products: Microsoft, America On Line and Others Look to Offer Solutions; Multimedia Week; vol. 3, No. 10; Mar. 7, 1994; pp. 1-8.
Simon & Schuster Inc.; Webster's New World Dictionary of Computer Terms, Fourth Edition; Prentice Hall; 1992; pp. 45, 95, 94, and 191.
Simon; Pipeline: Enter the Internet; PC Magazine; Feb. 8, 1994, p. 46.
Slay; Money Management Cures; MacWorld; Mar. 1991; pp. 152-158.
Smith et al.; Navigating the Internet, Deluxe Edition; Sams Publishing; 1994; pp. i-xxvii, 1-640.
Sportswire; Computer Games Strategy Plus; No. 44; Jul. 1994.
Stangenes; 'First' teams up with Microsoft on home banking; Chicago Tribune; Nov. 19, 1993.
Steinberg; GeoQuery: GeoQuery's mapping tool gains tighter links to spreadsheet and database programs; MacUser; vol. 8, No. 10; Oct. 1992.

Stephen Nathans; The CD/Online Enablers: Vendors and Services Taking the Hybrid Lead; Information Access Company, ASAP, Pemberton Press Inc.; Mar. 1996.
Steven Newcomb, Neill Kipp, and Victoria Newcomb; The 'HyTime' Hypermedia/Time-based Document Structuring Language; Communications of the ACM; vol. 34, No. 11; Nov. 1991; p. 67.
Stonebraker; The INGRES Papers: Anatomy of a Relational Database System; 1986.
Sugawara; Microsoft's Very Big Ballpark Estimate; Software Giant's 'Complete Baseball' Opens a Window on Its Ambitious On-Line Plans; The Washington Post; May 7, 1994.
Summer CES; Computer Games Strategy Plus; Issue 22; Sep. 1992.
Sun Microsystems; Solaris Infoware 2: Internet Edition; 1994.
Swenson; Banking through home computer has arrived; Journal Am; May 23, 1994.
Swenson; New software aimed at kids, baseball fans; Journal American; Mar. 2, 1994.
Swenson; Software you can bank on: Microsoft, U.S. Bank to put financial services within modems' reach; Journal Am; Dec. 7, 1993.
Symantec; Scenarios 1-6 and SAM Screen Captives. Identified in Appendix B of Defendants' P.R. 3-3 Invalidity Contentions in *Disc Link* v. *H&R* Case No. 5:06-CV-00295-DF dated Nov. 1, 2007.
Symantec; Symantec Antivirus for Macintosh 4.0 and related documentation (SAM 4.0). Identified in Appendix B of Defendants' P.R. 3-3 Invalidity Contentions in *Disc Link* v. *H&R* Case No. 5:06-CV-00295-DF dated Nov. 1, 2007.
Symantec; Symantec's SAM Manual; 1994.
Szymonik; World at War: Operation Crusader; Computer Games Strategy Plus; No. 41; Apr. 1994; pp. 38-39.
Taylor et al.; 'Intermedia' Shows a Maturing Multimedia Industry; Publishers Weekly; Mar. 21, 1994.
Teleshuttle Corp.; Resource Guide on Distributed Media: Local / CD-ROM / Online / Web; 1996-7.
The Public Access Computer Systems Review; University Libraries. University of Houston; 1994.
Theodor Holm Nelson; Literary Machines 90.1; 1990.
Thomas Pack; Greater than the Sum of their Parts: CD-ROM/Online Hybrids; Online Inc.; Mar. 1996.
Thro; The Database Dictionary; Microtrend Books; 1990; p. 68.
Tom Speyer; Memorandum re "Interface between CD ROM and TaxRIA/AccessPlus"; Jul. 15, 1992.
Transcript of Deposition of *Hark Chan in Chan et al.* v. *Intuit et al.*, N. D. Cal. Case No. C 02-2878 (VRW); May 2, 2003; pp. 1-3 (Index).
Transcript of Deposition of *Heinz Lycklama, Ph.D. in Chan et al.* v. *Intuit et al.*, N. D. Cal. Case No. C 02-2878 (VRW); May 23, 2003; pp. 1-150.
Transcript of Deposition of *Robert Bruce in Chan et al.* v. *Intuit et al.*, N. D. Cal. Case No. C 02-2878 (VRW); Sep. 3, 2003; pp. 1-216.
Transcript of Videotaped Deposition of *Douglas Branstetter in Chan et al.* v. *Intuit et al.*, N. D. Cal. Case No. C 02-2878 (VRW); Aug. 6, 2003; pp. 1-258.
Transcript of Videotaped Examination Before Trial of *Russell Neil Nelson in Chan et al.* v. *Intuit et al.*, N.D. Cal. Case No. C 02-2878 (VRW); Aug. 22, 2003; pp. 1-141.
Transcript Videotaped Examination Before Trial of *Russell Neil Nelson in Chan et al.* v. *Intuit et al.*, N.D. Cal. Case No. C 02-2878 (VRW); Aug. 22, 2003; pp. 1-141, 142-154.
USA: Microsoft has Baseball CD-ROM; Reuters News Service; Jun. 10, 1994.
Vaughn; Publishing on CD-ROM: The NautilusCD experience; CD-ROM Professional; vol. 7, No. 3; May/Jun. 1994; pp. 59-68.
VHS Cassette Tape: CCH Access CD-ROM Version 2.0. Identified in Appendix B of Defendants' P.R. 3-3 Invalidity Contentions in *Disc Link* v. *H&R* Case No. 5:06-CV-00295-DF dated Nov. 1, 2007.
VHS Cassette Tape: Complete Baseball Overview; May 9, 1994.
VHS Cassette Tape: Microsoft Complete Baseball & Video Clips 11 Minutes. Identified in Appendix B of Defendants' P.R. 3-3 Invalidity Contentions in *Disc Link* v. *H&R* Case No. 5:06-CV-00295-DF dated Nov. 1, 2007.
VHS Cassette Tape: Microsoft Complete Baseball Sneakers Nina Roberts & Sheila Geraghty; Feb. 4, 1994.
VHS Cassette Tape: MS Baseball Clips; Nov. 11, 1993.
VHS Cassette Tape: MS Complete Baseball; Jan. 26, 1994.
VHS Cassette Tapes: Commerce Clearing House; CCH Access Marketing Video. Identified in Appendix B of Defendants' P.R. 3-3 Invalidity Contentions in *Disc Link* v. *H&R* Case No. 5:06-CV-00295-DF dated Nov. 1, 2007.
Vogt; CD-ROM and online—competitors or compatriots? An online host's point of view; Online Information 92, 16th International Online Information Meeting Proceedings, London; Dec. 8-10, 1992; pp. 33-45.
Walnut Creek CDROM; FreeBSD 1.1, UNIX; May 1994.
Warner; Sports Computer Games: Several new football games out; The Atlanta Journal and Constitution; Nov. 17, 1991; Sports section F, p. 2.
Warner; Tax Services and Tax Forms on CD-ROM; The CPA Journal; Nov. 1993; pp. 48-52.
Wei; A Brief Overview of the VIOLA Engine, and its Applications; Identified in Appendix B of Defendants' P.R. 3-3 Invalidity Contentions in *Disc Link* v. *H&R* Case No. 5:06-CV-00295-DF dated Nov. 1, 2007.
West Premise; West. Identified in Appendix B of Defendants' P.R. 3-3 Invalidity Contentions in *Disc Link* v. *H&R* Case No. 5:06-CV-00295-DF dated Nov. 1, 2007.
West Publishing Co., Production Release Dates listing Premise releases 1988-1996; 1996.
West Publishing Co.; West Publishing CD-ROM Sales Calendar Year 1989-1993.
West Services Inc.; Letter to Premise Subscriber "Welcome to the Exciting New World of CD-ROM Research Using Premise 1.4!". Identified in Appendix B of Defendants' P.R. 3-3 Invalidity Contentions in *Disc Link* v. *H&R* Case No. 5:06-CV-00295-DF dated Nov. 1, 2007.
West Services Inc.; Making the Easy Transition to Premise 1.4! Premise 1.4 Highlights; 1991.
West Services Inc.; Premise Notebook; 1991.
West Services Inc.; Premise Notebook; 1991.
West Services Inc.; Premise, Quick Reference Card; 1991.
West Services Inc.; Premise, User Manual, 2nd Edition; 1991; pp. 1-162.
West Services Inc.; Premise, User Manual; 1992; pp. 1-56.
West Services Inc.; Premise, User Packet; 1991.
West Services Inc.; QuickScan on Premise; 1991.
West Services Inc.; Reference Manual, Revised Edition; 1989; pp. 1-221 and Reference Manual, Addendum; 1990.
West Services Inc.; West's CD-ROM Communique, Special Issue; Spring 1991.
Wiggins; The University of Minnesota's Internet Gopher System: A Tool of Accessing Network-Based Electronic Information; The Public-Access Computer Systems Review; vol. 4; 1993; pp. 24-76.
WordPerfect Corporation; Online Technical Support Service. Identified in Appendix B of Defendants' P.R. 3-3 Invalidity Contentions in *Disc Link* v. *H&R* Case No. 5:06-CV-00295-DF dated Nov. 1, 2007.
WordPerfect Corporation; WordPerfect Version 6.0, Windows; 1993; pp. 5-6, 876-883.
Defendants' P.R. 3-3 Invalidity Contentions in *Disc Link* v. *H&R* Case No. 5:06-CV-00295-DF and *Disc Link* v. *Oracle* Case No. 5:07-CV-58-DF; Nov. 1, 2007; pp. 1-26.
Identification of Prior Art; pp. 1-5; Exhibit a in Nov. 1, 2007 Defendants' P.R. 3-3 Invalidity Contentions in *Disc Link* v. *H&R* Case litigation.
Identification of Additional Prior Art; pp. 1-50; Exhibit B in Nov. 1, 2007 Defendants' P.R. 3-3 Invalidity Contentions in *Disc Link* v. *H&R* Case litigation.
Claim 17 v. *CompuServe CD*; Exhibit C in Nov. 1, 2007 Defendants' P.R. 3-3 Invalidity Contentions in *Disc Link* v. *H&R* Case litigation.
Claim 17 v. *Prior Art: PC Gopher*; Exhibit C in Nov. 1, 2007 Defendants' P.R. 3-3 Invalidity Contentions in *Disc Link* v. *H&R* Case litigation.
Claim 17 v. *Quicken Companion CD*; Exhibit C in Nov. 1, 2007 Defendants' P.R. 3-3 Invalidity Contentions in *Disc Link* v. *H&R* Case litigation.
Claim 17 v. *PacketDriver*, InfoMac, SunSoft CD/NCSA Mosaic; Exhibit C in Nov. 1, 2007 Defendants' P.R. 3-3 Invalidity Contentions in *Disc Link* v. *H&R* Case litigation.

*Claim 17 v. Free BSD and SunSoft CD/Lynx*; Exhibit C in Nov. 1, 2007 Defendants' P.R. 3-3 Invalidity Contentions in *Disc Link* v. *H&R* Case litigation.

*Claim 17 v. Premise Prior Art*; Exhibit C in Nov. 1, 2007 Defendants' P.R. 3-3 Invalidity Contentions in *Disc Link* v. *H&R* Case litigation.

*Claim 17 v. RIA OnPoint Prior Art*; Exhibit C in Nov. 1, 2007 Defendants' P.R. 3-3 Invalidity Contentions in *Disc Link* v. *H&R* Case litigation.

*Claim 17 v. Baseball Prior Art*; Exhibit C in Nov. 1, 2007 Defendants' P.R. 3-3 Invalidity Contentions in *Disc Link* v. *H&R* Case litigation.

*Claim 17 v. Prior Art*: AppleLink versions 6.0 / 6.1; Exhibit C in Nov. 1, 2007 Defendants' P.R. 3-3 Invalidity Contentions in *Disc Link* v. *H&R* Case litigation.

*Claim 17 v. AOL 1.0*; Exhibit C in Nov. 1, 2007 Defendants' P.R. 3-3 Invalidity Contentions in *Disc Link* v. *H&R* Case litigation.

*Claim 17 v. NautilusCD*; Exhibit C in Nov. 1, 2007 Defendants' P.R. 3-3 Invalidity Contentions in *Disc Link* v. *H&R* Case litigation.

*Claim 17 v. Prior Art*: U.S. Patent No. 5,761,649 (Hill); Exhibit C in Nov. 1, 2007 Defendants' P.R. 3-3 Invalidity Contentions in *Disc Link* v. *H&R* Case litigation.

*Claim 17 v. Prior Art*: U.S. Patent No. 5,555,407 (Cloutier); Exhibit C in Nov. 1, 2007 Defendants' P.R. 3-3 Invalidity Contentions in *Disc Link* v. *H&R* Case litigation.

Claim 17 v. Prior Art: Rich Wiggins, "The University of Minnesota's Internet Gopher System: A Tool for Accessing Network-Based Electronic Information." The Public-Access Computer Systems Review 4, No. 2 (1993) ; Exhibit C in Nov. 1, 2007 Defendants' P.R. 3-3 Invalidity Contentions in *Disc Link* v. *H&R* Case litigation.

*Claim 17 v. Prior Art*: Internet Engineering Task Force, "RFC1436: The Internet Gopher Protocol (a distributed document search and retrieval protocol)"; Exhibit C in Nov. 1, 2007 Defendants' P.R. 3-3 Invalidity Contentions in *Disc Link* v. *H&R* Case litigation.

*Claim 17 v. Prior Art*: U.S. Patent No. 5,694,546 (Reisman); Exhibit C in Nov 1, 2007 Defendants' P.R. 3-3 Invalidity Contentions in *Disc Link* v. *H&R* Case litigation.

*Claim 17 v. Prior Art*: Darell R. Raymond and Frank Wm. Tompa, "Hypertext and the New Oxford English Dictionary," Hypertext '87 papers at 143-53, ACM 089791-340-X/89/0011/0153; Exhibit C in Nov. 1, 2007 Defendants' P.R. 3-3 Invalidity Contentions in *Disc Link* v. *H&R* Case litigation.

*Claim 17 v. Reality Wealthbuilder*; Exhibit C in Nov. 1, 2007 Defendants' P.R. 3-3 Invalidity Contentions in *Disc Link* v. *H&R* Case litigation.

*Claim 17 v. Prior Art*: Symantec's SAM 4.0 Manual; Exhibit C in Nov. 1, 2007 Defendants' P.R. 3-3 Invalidity Contentions in *Disc Link* v. *H&R* Case litigation.

*Claim 17 v. Prior Art* (U.S. Patent No. 5,157,783—Wang West); Exhibit C in Nov. 1, 2007 Defendants' P.R. 3-3 Invalidity Contentions in *Disc Link* v. *H&R* Case litigation.

*Claim 17 v. Line Mode*; Exhibit C in Nov. 1, 2007 Defendants' P.R. 3-3 Invalidity Contentions in *Disc Link* v. *H&R* Case litigation.

Microsoft; Microsoft Complete Baseball (Complete Baseball) (with CD disks); May 1994; (Joint 7879, 7886, and 7890).

\* cited by examiner

INFORMATION DISTRIBUTION AND PROCESSING SYSTEM

BACKGROUND OF THE INVENTION

This application is a continuation of application Ser. No. 10/244,850 filed Sep. 17, 2002 now U.S. Pat. No. 6,789,198, which is a continuation of application Ser. No. 09/177,681 filed Oct. 22, 1998, now U.S. Pat. No. 6,473,860, which is a continuation in part of application Ser. No. 08/939,368 filed Sep. 29, 1997, now U.S. Pat. No. 6,021,307, which is a continuation in part of application Ser. No. 08/644,838 filed May 10, 1996, now abandoned, which is a continuation in part of application Ser. No. 08/279,424 filed Jul. 25, 1994, now abandoned, and application Ser. No. 08/255,649 filed Jun. 8, 1994, now abandoned, which is a continuation in part of application Ser. No. 08/224,280 filed Apr. 7, 1994, now abandoned. All these patent applications are incorporated herein by reference.

The present invention relates to method and apparatus for distributing and processing information, and more specifically relates to method and apparatus for preventing unauthorized use of information by partially encrypting such information.

With the advance of electronic and communication technology, information conveyed in electronic form ("electronic content") is fast becoming the most economic and reliable way of distributing information. However, many information providers are reluctant to distribute electronic content because it is very easy to copy and use the information without authorization. In spite of the existence of copyright law, experience shows that electronic content are often copied and used without paying any royalties to copyright holders. Thus, in order to promote the use of electronic conveyance of information, means must be develop to prevent unauthorized usage and copying of electronic content.

Methods have been developed to prevent unauthorized copying of electronic content. Several years ago, these methods were used by many software developers. However, these copy protection methods do not find acceptance in the market place. Consequently, the majority of computer software is currently marketed without copy protection.

Recently, attention has been turned towards preventing unauthorized uses. For example, several companies market "dongles," or hardware keys, which are attached to a port of a computer. Protected software would not execute in a computer without an appropriate key. Thus, the protected software could be copied but cannot be used in an unauthorized computer. However, many users found that these software and hardware keys cause much inconvenience. For example, when a user wishes to remove the software from one computer and execute the software in another computer, the associated hardware key has to be moved. So far, no mass marketed software uses hardware key to protect against unauthorized uses.

Other methods have been developed to prevent unauthorized usage of electronic content. One of the methods is disclosed in U.S. Pat. No. 5,010,571 issued to Katznelson. It discloses a system for controlling and accounting for retrieval of data from an optical storage medium containing encrypted data files from which retrieval must be authorized. The optical storage medium is distributed to customers at nominal or no charge. However, in order to decrypt the data files, a customer must obtain a decryption key from a remote authorization and key distribution station. As a result, unauthorized uses can be prevented. A similar system is disclosed in U.S. Pat. No. 4,827,508 issued to Shear. In Shear, the decryption key is stored in a secure device in the customer site. The secure device also stores accounting data relating to usage of the electronic content. The accounting data is periodically sent to a billing station.

In the above methods disclosed by Katznelson and Shear, vast amount of distributed information is encrypted using a single key (or a small number of keys). Thus, if the decryption key is inadvertently made public, all these information can be used without paying the information providers. Naturally, information providers are reluctant to rely on these methods to distribute their valuable asset (i.e., information).

Another problem with these prior art methods is that information providers cannot match the security level of encryption to the value of the information. Typically, the security of encryption is directly related to the complexity of encryption algorithm and the length of keys. The choice of encryption algorithms and the length of keys require an analysis of the value of the information and the costs of encryption. In the methods disclosed by Katznelson and Shear, all information is encrypted using the same key. Thus, this key may not match the requirements of many information providers.

A further problem of these prior art method is that the encryption algorithm is fixed at the time encrypted information is initially distributed. As the installed base of encrypted information increases, it becomes difficult to change the encryption algorithm. Thus, these methods cannot use new cryptographic methods, which may be developed in future.

Another method is disclosed in U.S. Pat. No. 5,247,575 issued to Sprague et al. It discloses that encrypted information may be electronically transmitted from a remote site to a receiving device in a customer site via wired or wireless means. It also discloses that the decryption key could be stored in a removable "key" card. The card can be inserted into the receiving device to decrypt the received and encrypted data. This method suffers the same defects described above in connection with Katznelson and Shear. In addition, this method requires a communication channel having a large bandwidth for transmitting the encrypted information.

SUMMARY OF THE INVENTION

Broadly stated, the invention involves a method and system for distributing and processing digital information. The digital information is separated into two portions. The first portion is a clear portion and the second (residual) portion is encrypted. The clear and the encrypted portions are sent to a processing system that decrypts the encrypted portion. The clear and decrypted portion is combined to obtain a result that is substantially the same as the original digital information.

In one embodiment of the present invention, the clear portion is distributed to customers at no or nominal cost. The residual portion will be stored in a central station. When a customer wishes to use the digital information, the central station encrypts the residual portion using an encryption-decryption key-pair generated at that time. The encrypted portion and the decryption key are sent to the processing system in a secure manner. As a result, different keys can be used to encrypt and decrypt the same information at different times.

One feature of the present invention is that the clear portion is selected in a way to render the reconstruction of the original digital information difficult if the residual portion is not known. Thus, a customer will not be able to reconstruct the original digital information based on the clear portion. As a result, unauthorized use of the digital information is prevented.

In the present invention, the information providers control the choice of encryption algorithms and keys. Further, algorithms and keys can be changed at will.

These and other features and advantages of the present invention will be fully understood by referring to the following detailed description in conjunction with the accompanying drawings.

DETAILED DESCRIPTION OF THE INVENTION

Figure 1:
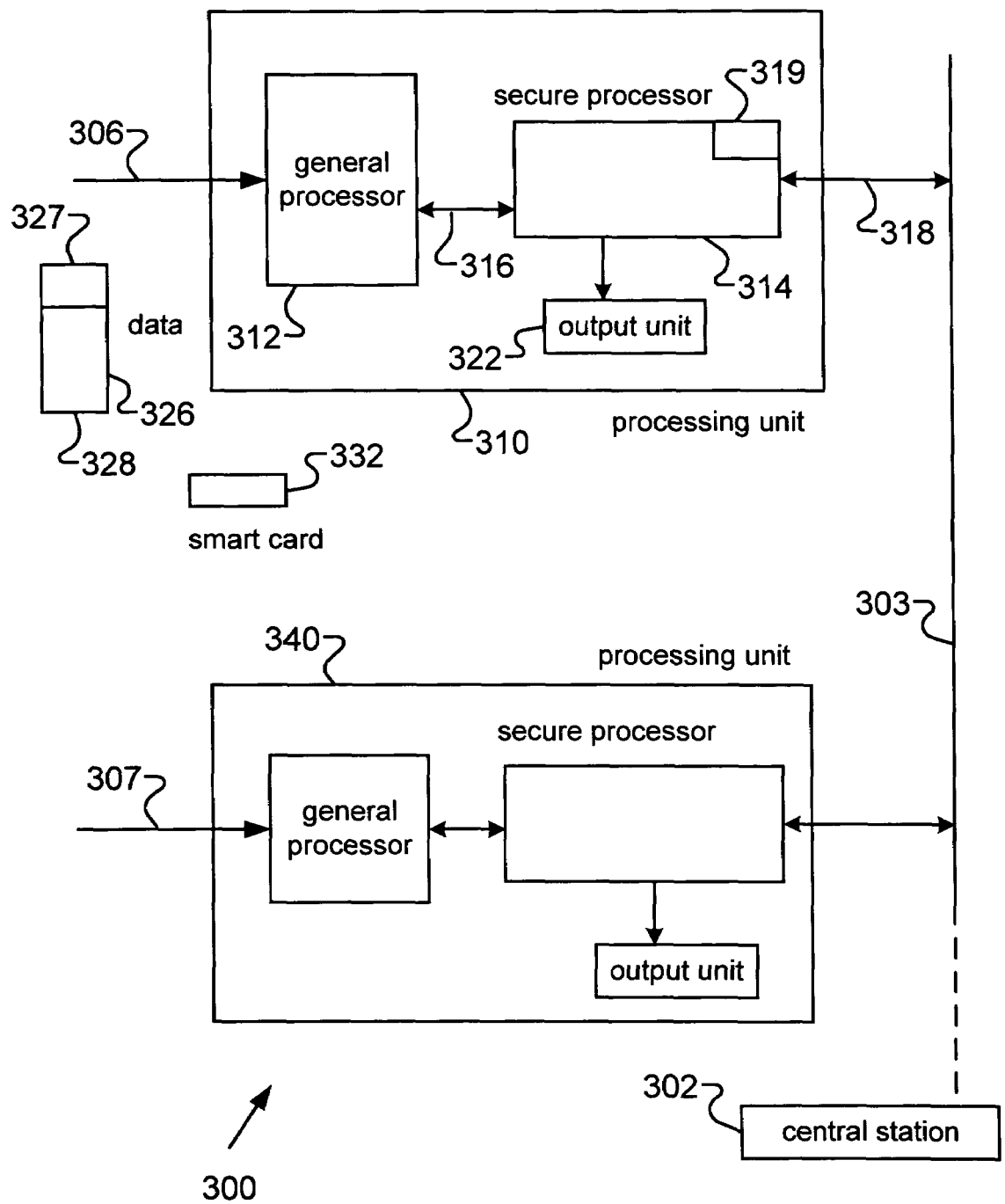
FIG. 1 is a block diagram of an information distribution and processing system in accordance with the present invention

FIG. 1 is a block diagram of an information distribution and processing system 300 in accordance with the present invention. System 300 contains a central station 302 which is connected via a communication link 303 to a plurality of processing units located in subscriber sites, such as units 310 and 340. Processing units 310 and 340 are also connected to communication links 306 and 307, respectively. Communication links 306 and 307 are preferably not connected to central station 302, but may be connected thereto when needed. Communication links 303, 306, and 307 could be wired or wireless, remote or local, point-to-point or broadcasting.

Digital information to be distributed is separated into clear (i.e., unencrypted) portions and residual portions in accordance with methods described below. The residual portions are essentially the digital information with the clear portions removed. The clear portions are sent to processing units 310 and 340 via links 306 and 307, respectively. The residual portions are stored in central station 302 and will be encrypted before sending to processing units 310 and 340 upon demand. Central station 302 also takes care of various accounting and bookkeeping functions.

The structure of the processing units is substantially the same. Thus, only one of the units, in this case, unit 310, will be described in detail. Unit 310 contains a general processor 312 connected to a secure processor 314 through a communication link 316 (which could be wired or wireless). Secure processor 314 is connected to communication link 303 through a line 318. Secure processor 314 is enclosed by a protective mechanism so that unauthorized access (physical and electrical) to the internal circuitry can be prevented. Secure processor 314 is used to decrypt encrypted portions and temporarily store secret information (such as decryption keys and usage data). Unlike secure processor 314, general processor 312 does not have to be placed in a secure enclosure. Thus, it could be a conventional computer.

In system 300, general processor 312 is used to process the unencrypted data (e.g., decompression, filtering, and error correction) received from communication link 306 while secure processor 314 is used to process encrypted data (e.g., decryption and decompression) received from communication link 303. Secure processor 314 and general processor 312 can communicate with each other using communication link 316. This link does not have to be a secure communication link.

Secure processor 314 preferably contains a unique device ID. This device ID is preferably permanently stored in a nonvolatile memory 319, such as a ROM. The device ID allows secure processor 314 to identify itself to other devices, such as central station 302.

A typical operation of system 300 is now described. Information data is separated in residual data and unencrypted data according to methods described below. The residual data is preferably a small percentage of the unencrypted data. Unencrypted data 326 preferably contains an information ID 327 and a content portion 328. Content portion 328 could contain data relating to video, text, audio, or their combination.

Unencrypted data 326 is sent to general processor 312 of processing unit 310 through communication link 306. General processor 312 sends the information ID 327 to secure processor 314, which in turn forwards it to central station 302 via communication link 303. At the same time, the device ID stored in memory 319 is also sent to central station 302 so that it can keep track of usage and billing information. Central station 302 encrypts the corresponding residual data and sends the encrypted data to secure processor 314 via communication link 303. Because link 303 is not a secure link, special methods, described below, need to be used for central station 302 to securely send the corresponding decryption key to secure processor 314. Secure processor 314 decrypts the received encrypted data and combines the result with the unencrypted data so as to reconstruct the full digital information.

The key used for encrypting and decrypting the encrypted data could be different for each processing and communication session described above. Thus, it is more difficult for unauthorized persons to obtain the decryption key to decrypt the encrypted data. Even assuming that a few decryption keys are inadvertently disclosed to unauthorized persons, only a few pieces of information is compromised. This is different from the system disclosed in the prior art, where inadvertent disclosure of a single decryption key may compromise vast amount of information.

Processing unit 310 also contains an output unit 322, which may be connected to general processor 312 or secure processor 314. Depending on the information processed, output unit 322 may be a printer, loudspeaker, TV, or LCD display. In situations where it is not desirable to expose the reconstructed information, output unit 322 should be securely connected to secure processor 314.

Even though FIG. 1 shows secure processor 314 as a single block, the function of secure processor 314 could be carried out in several components. For example, the device ID could be stored in a smart card 332 that is removably connected to processing unit 310. Smart card 332 should be protected from unauthorized intrusion.

Methods for separating information into unencrypted and residual portions are now described. It has been observed that information generally has a certain degree of correlation. At one extreme is information that is highly correlated. An example is video information that consists of a series of pictures depicting time progression of a scene. Each picture typically differs slightly from an adjacent picture in the series because the time difference in the scene depicted by adjacent pictures is typically less than 0.1 second. As a result, video information contains many pictures that are substantially the same. Consequently, it is easy to construct a picture missing from the series by interpolating from the pictures prior and subsequent to the missing picture. This type of information is considered to have a high degree of temporal correlation.

Video information also has another type of correlation. The spatial variation of a picture is typically very gentle. For example, if the picture is a human swimming in water, there is little variation (in terms of color and intensity) in the portion of the picture relating to water. Consequently, it may be easy to recreate a missing portion of a picture by interpolating from portions of the picture surrounding the missing portion. This type of information is considered to have a high degree of spatial correlation.

At the other extreme is information for which it is difficult to create a missing portion from other portions. This type of information has a low degree of correlation. An example of this type of information is the binary code of a piece of software. Typically, it is difficult to recreate a missing byte (or a series of missing bytes) from other bytes in the binary code.

In the middle of this spectrum of correlation is text information. The structure of many languages dictates that redundant words or letters be used at predetermined positions of a sentence. Thus, it is possible to guess missing words and letters in a sentence. For example, the grammar of the English language imposes a set of rules which includes putting the letter "s" at the end of a noun to designate plural quantity. In many sentences, the noun is not the only place where plural quantity is indicated. For example, the sentence "there are two birds" uses the word "two" to indicate the existence of more than one bird, in addition to the letter "s" attached to the word "bird." Thus, the letter "s" at the end of the word "bird" is correlated to the word "two" in the above sentence. Similarly, the word "are" is correlated with the word "two."

Information can also be classified according to its effect on intended uses if a portion of the information is missing. At one extreme is information that would be useless if a small portion were missing. An example is the binary code of a piece of software. A computer is unlikely to successfully execute the software if the binary code has a few erroneous bytes. This type of information is considered to be error intolerant. At the other extreme is information that degrades gracefully. For example, when noise of TV signal increases (i.e., portions of video information is missing or has erroneous values), color TV pictures often become monochrome. However, it is still possible to watch and comprehend the TV pictures, even though they are less pleasing to the eyes. This type of information is considered to be error tolerant. Error toleration can also be different depending on spatial or temporal types of errors.

It should be pointed out that even though the degree of error tolerance has some relationship to the degree of correlation of information, it does not depend solely on the degree of correlation. For example, a person typically does not tolerate a small distortion in a familiar song while may tolerate a large distortion in a new song, even though the degree of correlation of these two songs is the same. As another example, a reader is likely to tolerate a large number of missing words in a newspaper article. On the other hand, the same reader probably would not tolerate the same percentage of missing words in a poem. Thus, even though the degree of correlation of the newspaper article and poem may be the same (because they follow essentially the same grammar rules), the degree of error tolerance is different. This is because error tolerance depends, to a certain extent, on subjective considerations.

In the prior art information distribution and processing systems using cryptography, every bit of information is encrypted. One aspect of the present invention is the realization that it may not be necessary to completely encrypt the information, especially when it has a low degree of correlation. This is because it is often difficult to reconstruct the residual portions based on the clear portions of information. In addition, information that has a low degree of error tolerance may only need to be encrypted at a few critical places (e.g., the destination address of a jump op code, or the last name field of a customer database). This is because a user would not accept the information if a small portion were missing or erroneous. Thus, even though most of the information is in the clear, it is still not commercially useful if isolated portions are unavailable because they cannot be decrypted (i.e., people are still willing to pay a high price to obtain the full information, even though they already have 99 percent of the information). Since only a small portion of information need to be decrypted, the amount of computation power required to decrypt the information is reduced.

Encrypting a portion of information may also help to reduce the computation power required for other signal processing tasks. As an example, information which is massive and highly correlated (e.g., video information) is often compressed in order to reduce the amount of memory space used for storing and the bandwidth used for transmitting the information. Many compression methods make extensive use of the correlative nature of information. However, many encryption methods have a tendency to randomize information. For example, if the plain text is a string of identical letters, the encrypted text using algorithms such as DES may be a string of letters in which every letter is different. Consequently, it may be more difficult to compress the encrypted text.

The word "encryption" is used broadly in the present invention to include different ways of transforming information so that it is difficult for an unauthorized person to correctly understand the information. It includes transformation in which a key is required, such as public key and secret key encryption methods. It also includes scrambling information according to a secret algorithm without using a particular parameter that may be classified as a "key."

The word "information" is used broadly in the present invention to include data that is organized in some logical manner. Examples of information include video signal, audio signal, picture, graphic, computer software, text, database, and multimedia composition.

In another embodiment of the present invention, information is encrypted in different levels of security. In this embodiment, most of the information is encrypted using a method having a low level of security (instead of no encryption, as are the embodiments described above) and a portion of the information is encrypted using a method having a high level of security. Typically, the amount of computational power needed for decryption is positively related to the level of security. Thus, information encrypted using a method having a low level of security requires less time to decrypt.

An example of distributing graphic images using the above-described method is now described. Because of the rich information content of graphic images, they require a large number of bytes to digitize. Consequently, it is common to compress the digitized graphic images. One of the most popular methods is JPEG (Joint Photographic Experts Group). An application of the present invention to JPEG is now described. It should be appreciated that the same principle can be applied to other methods of processing graphic images.

It is known that human eye is less sensitive to color changes than to brightness changes. Thus, the chrominance component can be coded with more loss than the luminance component. For example, a widely used color scheme is CCIR 601, in which three components, Y, $C_b$, and $C_r$, are used. Under this color scheme, the Y component roughly represents the brightness of a color image, and can be used as a black-and-white version of the color image. The $C_b$ and $C_r$ components roughly represent the blueness and redness, respective, of the image.

JPEG works best when applied to color data expressed as luminance (brightness) and chrominance components because it allows these components to be sampled at different rate (i.e., subsampling). When JPEG is used to compress a $YC_bC_r$ image, a fair common choice is to use one $C_b$ and $C_r$ sample for each four Y samples. Each of the sampled components is discrete cosine transformed and then quantized in accordance with a quantization table. The results of quantization are compressed using either a modified Huffman code or arithmetic coding.

If color fidelity is an important element of the images, it may be sufficient to encrypt only the $C_b$ or $C_r$ component in order to prevent unauthorized uses. In this case, only a small portion of the digital data needs to be encrypted.

The quantization table is stored in a JPEG file. In some situations, it may be sufficient to only encrypt the quantization table. Again, only a small portion of the digital data needs to be encrypted.

Figure 2:
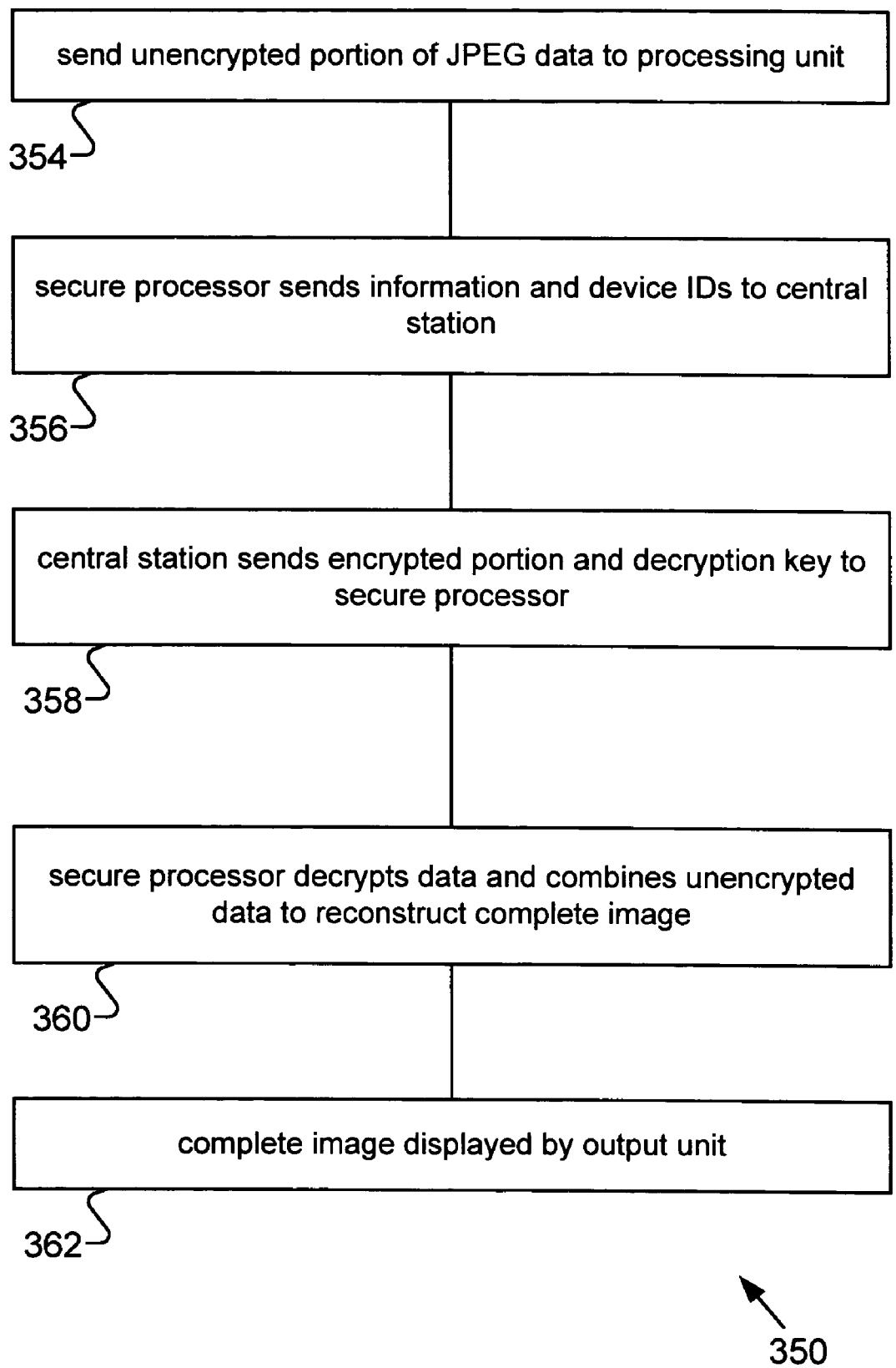
FIG. 2 is a flow chart showing the application of the present invention to JPEG.

FIG. 2 is a flow chart 350 showing a method of using the information distribution and processing system 300 of FIG. 1 to distribute and process graphic images in JPEG form. The JPEG data is separated into unencrypted and residual portions according to the method described above. The unencrypted portion of the JPEG file is sent to processing unit 310 through communication link 306 (step 354). For example, the unencrypted portion could be stored in an on-line bulletin board system and downloaded to processing unit 310 through a regular phone line. Alternatively, the unencrypted portion could be recorded in a portable memory medium (e.g., floppy diskettes, tapes, or CD-ROMs) and distributed to potential customers. General processor 312 reads the information ID 327 and causes the secure processor 314 to send the information ID and its device ID to central station 302 (step 356). Central station 302 then encrypts the residual portions and sends the encrypted portion (e.g., quantization table) to secure processor 314. Central station 302 also sends the decryption key to secure processor 314 using one of the well-known secure communication protocols (step 358). Secure processor 314 decrypts the data and causes general processor 312 to send the unencrypted JPEG portion thereto for generating a complete image (step 360). The image is sent to the output unit 322 for display (step 362).

Figure 3:
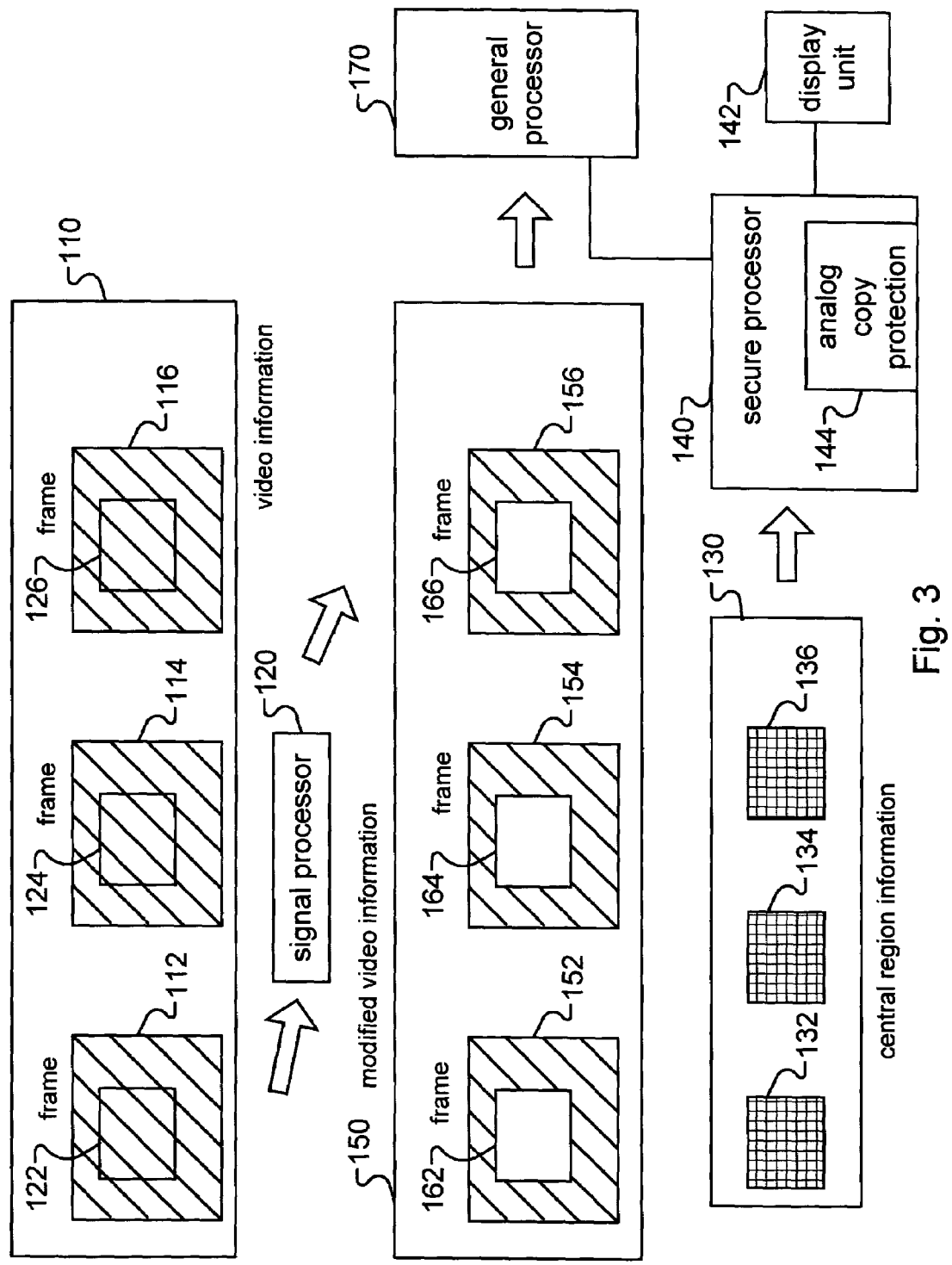
FIG. 3 is a schematic diagram showing the application of the present invention to video data.

FIG. 3 is a diagram showing one embodiment in which information having a high degree of correlation, such as video information 110, is processed with an information distribution and processing system of the present invention. Only three frame 112, 114 and 116 of video information 110 are shown, although video information 110 typically contains a large number of frames. Frames 112, 114, and 116 each has a centrally located region 122, 124, and 126, respectively, which are of similar size and shape. Only these regions are encrypted while the rest of the frames are in the clear. The area of each of these regions is preferably small compared to the size of a full frame.

Video information 110 is separated by a signal processor 120 into modified video information 150 and central region information 130. The three frames 112, 114, and 116 of the video information 110 are transformed into three frames 152, 154, and 156, respectively, of modified video information 150. Frames in the modified video information 150 do not contain information in the centrally located regions 162, 164, and 166 (which correspond to centrally located regions 122, 124, and 126, respectively). On the other hand, the frames 132, 134, and 136 in the central region information 130 contain only information relating to the centrally located regions 122, 124, and 126.

In the method of the present invention, only the centrally region information 130 needs to be encrypted while the modified video information 150 can stay in the clear. The modified video information 150 is sent to general processor 170, which corresponds to general processor 312 of FIG. 1. The central region information 130 is sent to secure processor 140, which corresponds to secure processor 314 of FIG. 1. The secure processor 140 decrypts the encrypted frames 132, 134, and 136 and combine them with frames 152, 154, and 156 to reconstruct the video images. These images are displayed by a display unit 142, which corresponds to output unit 322 of FIG. 1. In order to prevent unauthorized recording of the analog signal, it may be desirable to include a system of analog copy protection 144 in secure processor 140.

In this embodiment, substantially the same region of all the frames (i.e., frames corresponding to all times from beginning to end) are encrypted. Thus, it is not possible for an unauthorized person to take advantage of temporal correlation to reconstruct the centrally located regions because there is no basis to perform interpolation. It is also difficult to take advantage of spatial correlation near the center of the frame because there is little unencrypted data available at areas surrounding the center.

Stated in a slightly different way, the method disclosed above encrypts substantially all the correlated portions of the information. Since almost none of the correlated portions are in the clear, it is impossible to bypass the correlated portions by using techniques such as interpolation.

The size of the regions 122, 124 and 126 depends on the degree of error tolerance. If spatial error tolerance is low (i.e., a user will not tolerate even a small amount of erroneous spatial information), the size of the regions 122, 124 and 126 could be small. Further, for situations where temporal error tolerance is low, it is not necessary to encrypt the entire frame.

The reason for positioning the encrypted region at the center is to take advantage of the fact that the most informative area of a picture is usually the center. It may be advantageous to encrypt several regions (instead of only one centrally located region). This is because the most informative region in some cases may not be located at the center. Further, the size and shape of the encrypted regions may vary from frame to frame, as long as information relating to these sizes and shapes is transmitted to secure processor 140. As a result, secure processor 140 is able to reconstruct the video frames.

The encrypted region can also be selected using statistical methods. For example, the correlation within and between frames can be determined by a correlation coefficient r defined as $$r=E[(X-a)(Y-b)]/uv;$$

where X and Y are jointly distributed random variables with means a and b and variances $u^2$ and $v^2$, respectively. A region is selected for encryption when the corresponding correlation coefficient is higher than a certain value. Various statistical methods for determining appropriate selection criteria are well known in the art. These statistical methods can be used by signal processor 120.

FIG. 3 indicates that adjacent frames of video information 110 have the same format and contain the same type of information. However, the system shown in FIG. 3 is also applicable to video information in which adjacent frames have different formats. An example is MPEG (Motion Picture Experts Group), which contains JPEG-like frames along with information for interpolating other frames between the JPEG-like frames. The interpolating information is different from the JPEG-like frames. In one embodiment of the present invention, only the centrally located regions of the JPEG-like frames need to be encrypted. The interpolating information does not have to be encrypted. In this case, substantially all the correlated portions of movie is encrypted.

One of the advantages of the method of FIG. 3 is that only a small bandwidth needs to be used for transmitting the encrypted portion. In many applications, only about 1% of the area of a frame needs to be encrypted. Thus, the bandwidth of the communication channel linking the secure processor and the central station is about 1% of the bandwidth of the communication link coupled to the general processor.

Figure 4:
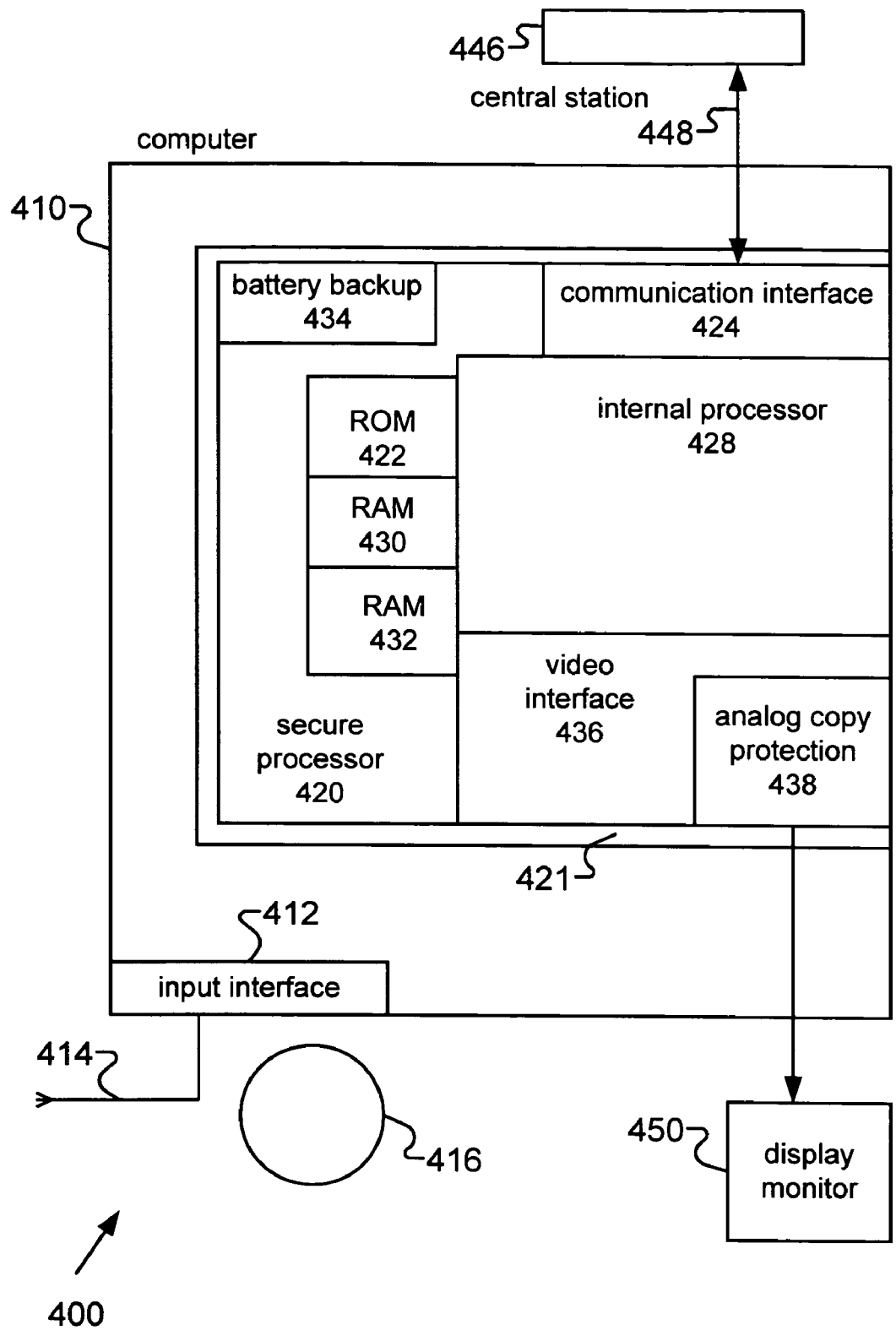
FIG. 4 is a block diagram of a software distribution and processing system of the present invention.

A software distribution and processing system 400 in accordance with the present invention is shown in FIG. 4. Examples of software include movie, games, and computer executable codes. System 400 includes a computer 410 (such as computers make by Apple and IBM) containing a conventional input interface 412. Input interface 412 could be a high speed communication port connected to a communication link, such as cable or telephone lines 414, or an memory reader, such as a CD-ROM reader for reading a CD-ROM 416. Input interface 412 accepts unencrypted data either from a remote site or CD-ROMs stored in the user site.

Computer 410 is coupled to a secure processor 420 that contains means 421 for preventing unauthorized probing into its internal structure (both mechanical and electrical). The communication between computer 410 and secure processor 420 does not have to be secure. Secure processor 420 could be a board inserted into a bus of computer 410 or an external device coupled to an input/output port of computer 410. If it is possible to integrate all the functions of secure processor 420 into a chip, secure processor could be incorporated directly into the motherboard of computer 410.

Secure processor 420 contains a nonvolatile storage area 422 (e.g., ROM) for storing, among other data, a secret key and a device ID that is unique to the secure processor. Secure processor 420 also contains a communication interface 424 for communicating with a central station 446 via a communicating link 448. Communicating link 448 does not have to be secure, and can be a regular telephone line or wireless link. Communication link 448 can also be a broadcasting channel wherein central station 446 can broadcast information to software distribution and processing system located in a large number of user sites.

Preferably, communication interface 424 contains means for error detection and correction. Communication interface 424 preferably contains means for allowing mutual authentication between secure processor 420 and central station 446. Such authentication means are well known. Examples of such means are disclosed in "Applied Cryptography: Protocols, Algorithms, and Source Code in C," published 1994 by John Wiley & Sons., Inc., and the references cited therein.

Communication interface 424 also contains means for allowing central station 446 to send a decryption key and other secret data to secure processor 420, preferably after authentication has been confirmed. It also allows secure processor 420 to send secret data, such as accounting data, to central station 446. Means for sending data (e.g., keys) securely via an insecure communication channel are well known. Examples of such means are key exchange protocols disclosed in "Applied Cryptography: Protocols, Algorithms, and Source Code in C," published 1994 by John Wiley & Sons, Inc., and the references cited therein.

If communication link 448 is a broadcasting communication link, central station 446 can broadcast the key and secret data on link 448. Communication interface 424 can listen to link 448 and retrieve information directed thereto. Other software distribution and processing systems connected to link 448 would not be able to retrieve such information. Examples of secret broadcasting are also disclosed in "Applied Cryptography Protocols, Algorithms, and Source Code in C," published 1994 by John Wiley & Sons, Inc., and the references cited therein.

Secure processor 420 contains an internal processor 428 and RAM 430 that together perform, among other tasks, authentication, decryption, and/or decompression. The central station 446 may also send instructions (in encrypted form) to internal processor 428 for execution. These instructions may be part of a decryption algorithm for decryption a particular piece of encrypted data sent by central station 446 to secure processor 420. The instruction set of internal processor 428 is preferably hidden from the general public. As a result, it is difficult for an unauthorized person to execute these instructions, even if the decryption key is inadvertently discovered by such person.

Secure processor 420 also contains RAM 432 for storing accounting data. Examples of accounting data are the number of times a user played a distributed software, the length of time a user executes the software, and personal data of a user, such as his/her credit card number. At predetermined time intervals, the accounting data is communicated to central station 446 via communication link 448 using the above described key exchange protocols. In order to maintain the accounting data even when regular power to secure processor 420 is disrupted, a battery backup means 434 is preferably included in secure processor 420.

Secure processor 420 contains a video interface 436 for generating analog video signal for display by an external display monitor 450. In order to prevent unauthorized copying of the analog video signal, means 438 for generating analog copy protection signal is included in video interface 436.

As an example, the use of software distribution and processing system 400 to process movie is now described. It should be obvious to use system 400 for processing other types of software. A digitized version of the movie is separated into two sets of data in accordance with the methods described above: a plain-text portion and a residual portion. These two sets of data also contain linkage information and identification labels allowing secret processor 420 to later combine these two sets of data to reconstruct the original digitized movie. These sets of data are compressed using a publicly known algorithm (such as MPEG) or a proprietary algorithm. The compressed plain-text data is recorded in a portable storage medium (e.g., CD-ROM) or stored in a central library (which could be located at central station 446). The CD-ROMs are distributed to users at nominal costs.

A user who desires to play the movie can insert the CD-ROM to input interface 412 of computer 410 or connect input interface 412 to the central library via link 414, depending on the manner the plain-text data is distributed. Computer 410 decompressed the received data. It also retrieves the movie identification label from the received data and sends the label to secure processor 420. Secure processor 420 initiates an authentication procedure with central station 446. Upon confirmation of authenticity, secure processor 420 transmits the label and its device ID (stored in ROM 422) to central station 446. Central station 446 retrieves the corresponding residual portion of the digitized movie, in response to the received label. Central station 446 also generates an encryption-decryption key-pair (which could be the same or different keys, depending on the encryption method used) for encrypting the residual data. The decryption key is sent to secure processor 420 using a secure communication protocol described above. The encrypted portion of the digitized movie is also sent to secure processor 420.

In this embodiment, the encryption-decryption key-pair could be different for different communication sessions. Thus, the information providers have full control of the keys instead of relying on keys imposed by third parties. As pointed out above, prior art information distribution systems rely on cryptographic technology at the time the information is recorded on CD-ROM, which could be more than a year before a user decrypts the information. On the other hand, the present invention allows information providers to use the most advanced cryptographic technology at the time the information is used.

The present invention also allows information providers to tailor the encryption-decryption key-pair to their needs. Thus, if the information is extremely valuable, an information provider can use a secure encryption algorithm (with the associated increase in computation requirements). On the other hand, if the information is not quite valuable, the information provider can use a moderate secure algorithm.

Secure processor 420 decompresses and decrypts the encryption residual data using the decryption key received from the central station 446. At the same time, computer 410 sends the plain-text data to secure processor 420. Secure processor 420 combines the data and reconstructs the original digitized movie data. The result is sent to video interface 436.

In response to the digitized movie data, video interface 436 generates analog video signal. Even though the above described method and device is able to distribute and process digital signals securely, the analog output video signal could be recorded and copied. Thus, it may be desirable to include a system of analog copy protection 438 in video interface 436. Examples of such a system are described in U.S. Pat. Nos. 4,577,216 and 4,631,603 issued to Ryan. Alternatively, digital signals for generating analog copy protection signal may be embedded into the digitized movie data.

In another embodiment of system 400, the "unencrypted" set of data is actually encrypted using a simple encryption algorithm. This embodiment increases the cost of the system, and in return, improves the security of the system. Thus, the present invention offers different level of security to match the need of the information providers.

There has thus shown and described a novel information distribution and process system. Many changes, modifications, variations and other uses and application of the subject invention will become apparent to those skilled in the art after considering this specification and the accompanying drawings. All such changes, modifications, variations, uses, and applications are covered by the scope of this invention which is limited only by the appended claims.

I claim:

1. A computer for receiving data from a remote station and a portable storage medium, comprising:
    an input interface for reading a first set of digital data recorded on the portable storage medium, the first set of digital data including unencrypted data and containing an identification;
    a first processor to retrieve the identification from the first set of digital data;
    a communication interface for sending the identification to the remote station and downloading from the remote station a second set of digital data associated with the identification; and
    a second processor for processing at least a portion of the first set of digital data and at least a portion of the second set of digital data, the second processor configured and arranged to perform at least one of decryption and authentication operations and to prevent unauthorized access into the internal structure of the second processor, the second processor having a non-volatile memory.

2. The computer of claim 1, wherein the non-volatile memory is used to store financial data.

3. The computer of claim 1, wherein the input Interface comprises a reader of optically encoded memory.

4. The computer of claim 1, wherein the second set of digital data is encrypted.

5. The computer of claim 1, wherein the second processor comprises a device identification.

6. The computer of claim 1, wherein the second set of digital data includes instructions to the second processor.

7. The computer of claim 1, wherein said second processor is configured to prevent unauthorized electrical access into its internal structure.

8. The computer of claim 1, wherein said second processor is configured to prevent unauthorized mechanical access Into its internal structure.

9. The computer of claim 1, wherein said portable storage medium includes at least one of a floppy disk, tape, and CD-ROM.

10. The computer of claim 1, wherein the second set of digital data includes a decryption key.

11. The computer of claim 1, wherein the first set of digital data includes at least one of video, text, and audio.

12. A computer for receiving data from a remote station and a portable storage medium, comprising:
    an input interface for reading a first set of digital data recorded on the portable storage medium, the first set of digital data including unencrypted data and containing an identification;
    a first processor to retrieve the identification from the first set of digital data;
    a communication interface for sending the Identification to the remote station and downloading from the remote station a second set of digital data associated with the identification; and
    a second processor for processing at least a portion of the first set of digital data and at least a portion of the second set of digital data, the second processor configured and arranged to perform at least one of decryption and authentication operations and to prevent unauthorized access into the internal structure of the second processor, the second processor having writable random access memory capable of maintaining its data even when power supplied to the second processor is disrupted.

13. The computer of claim 12, wherein the non-volatile memory is used to store financial data.

14. The computer of claim 12, wherein the input interface comprises a reader of optically encoded memory.

15. The computer of claim 12, wherein the second set of digital data is encrypted.

16. The computer of claim 12, wherein the second processor comprises a device identification.

17. The computer of claim 12, wherein the second set of digital data includes instructions to the second processor.

18. The computer of claim 12, wherein said second processor is configured to prevent unauthorized electrical access into its Internal structure.

19. The computer of claim 12, wherein said second processor is configured to prevent unauthorized mechanical access into its internal structure.

20. The computer of claim 12, wherein said portable storage medium includes at least one of a floppy disk, tape, and CD-ROM.

21. The computer of claim 12, wherein the second set of digital data includes a decryption key.

22. The computer of claim 12, wherein the first set of digital data includes at least one of video, text, and audio.

23. A computer for receiving data from a remote station and a portable storage medium, comprising:
   an input interface for reading a first set of digital data recorded on the portable storage medium, the first set of digital data including unencrypted data and containing an identification;
   a processor adapted to retrieve the identification from the first set of digital data; and
   a communication interface configured to send the identification to the remote station and download from the remote station a second set of digital data associated with the Identification, said processor including an Internal processor for processing at least a portion of the first set of digital data and at least a portion of the second set of digital data, the internal processor being configured to perform at least one of decryption and authentication operations, the internal processor being adapted to prevent unauthorized access into the Internal structure of the Internal processor, the internal processor having a non-volatile memory.

24. The computer of claim 23, wherein the non-volatile memory is used to store financial data.

25. The computer of claim 23, wherein the input Interface comprises a reader of optically encoded memory.

26. The computer of claim 23, wherein the second set of digital data is encrypted.

27. The computer of claim 23, wherein the Internal processor comprises a device identification.

28. The computer of claim 23, wherein the second set of digital data includes instructions to the Internal processor.

29. The computer of claim 23, wherein said internal processor is configured to prevent unauthorized electrical access into its Internal structure.

30. The computer of claim 23, wherein said internal processor is configured to prevent unauthorized mechanical access into its internal structure.

31. The computer of claim 23, wherein said portable storage medium includes at least one of a floppy disk, tape, and CD-ROM.

32. The computer of claim 23, wherein the second set of digital data includes a decryption key.

33. The computer of claim 23, wherein the first set of digital data includes at least one of video, text, and audio.

34. A computer for receiving data from a remote station and a portable storage medium, comprising:
   an input interface for reading a first set of digital data recorded on the portable storage medium, the first set of digital data including encrypted data and containing an identification;
   a processor adapted to retrieve the identification from the first set of digital data; and
   a communication interface configured to send the identification to the remote station and download from the remote station a second set of digital data including encrypted data and being associated with the Identification, the encrypted data from the first and second sets of digital data being encrypted at different levels of encryption, said processor including an Internal processor for processing at least a portion of the first set of digital data and at least a portion of the second set of digital data, the internal processor being configured to perform at least one of decryption and authentication operations, the internal processor having a non-volatile memory.

35. The computer of claim 34, wherein the non-volatile memory is used to store financial data.

36. The computer of claim 34, wherein the input interface comprises a reader of optically encoded memory.

37. The computer of claim 34, wherein the internal processor comprises a device identification.

38. The computer of claim 34, wherein the second set of digital data includes instructions to the Internal processor.

39. The computer of claim 34, wherein said internal processor is configured to prevent unauthorized electrical access into its internal structure.

40. The computer of claim 34, wherein said internal processor is configured to prevent unauthorized mechanical access into its internal structure.

41. The computer of claim 34, wherein said portable storage medium includes at least one of a floppy disk, tape, and CD-ROM.

42. The computer of claim 34, wherein the second set of digital data includes a decryption key.

43. The computer of claim 34, wherein the first set of digital data includes at least one of video, text, and audio.

* * * * *